(12) United States Patent
Nezamabadi et al.

(10) Patent No.: US 10,559,085 B2
(45) Date of Patent: Feb. 11, 2020

(54) DEVICES, SYSTEMS, AND METHODS FOR RECONSTRUCTING THE THREE-DIMENSIONAL SHAPES OF OBJECTS

(71) Applicant: CANON KABUSHIKI KAISHA, Tokyo (JP)

(72) Inventors: Mahdi Nezamabadi, San Jose, CA (US); Abhilash Sunder Raj, Menlo Park, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 15/689,996

(22) Filed: Aug. 29, 2017

(65) Prior Publication Data
US 2018/0165821 A1 Jun. 14, 2018

Related U.S. Application Data
(60) Provisional application No. 62/433,088, filed on Dec. 12, 2016, provisional application No. 62/450,888, filed on Jan. 26, 2017.

(51) Int. Cl.
| | |
|---|---|
| *G06T 7/514* | (2017.01) |
| *G06T 7/60* | (2017.01) |
| *G06T 19/20* | (2011.01) |
| *G06T 15/08* | (2011.01) |
| *H04N 13/271* | (2018.01) |

(52) U.S. Cl.
CPC ............... *G06T 7/514* (2017.01); *G06T 7/60* (2013.01); *G06T 15/08* (2013.01); *G06T 19/20* (2013.01); *H04N 13/271* (2018.05); *G06T 2200/04* (2013.01); *G06T 2200/08* (2013.01); *G06T 2207/10028* (2013.01); *G06T 2207/10152* (2013.01); *G06T 2219/2016* (2013.01)

(58) Field of Classification Search
CPC ............ G06T 7/514; G06T 7/521; G06T 7/60
See application file for complete search history.

(56) References Cited

U.S. PATENT DOCUMENTS
| | | | |
|---|---|---|---|
| 6,229,913 B1 | 5/2001 | Nayar | |
| 6,301,396 B1 | 10/2001 | Michael | |
| 6,903,738 B2 | 6/2005 | Pfister | |
| 7,075,097 B2 * | 7/2006 | Tobiason | ............... G01D 5/268 250/206.1 |

(Continued)

FOREIGN PATENT DOCUMENTS
| | | |
|---|---|---|
| CN | 101363712 A | 2/2009 |

OTHER PUBLICATIONS
Yair Adato et al., Shape from Specular Flow, IEEE Transaction on Pattern Analysis and Machine Intelligence, vol. 32, No. 11, Nov. 2010. pp. 2054-2070.

(Continued)

*Primary Examiner* — Anand P Bhatnagar
(74) *Attorney, Agent, or Firm* — Canon U.S.A., Inc. IP Division

(57) ABSTRACT

Devices, systems, and methods obtain respective spherical coordinates of points on an object, obtain respective spherical-coordinate representations of surface normals at the points on the object, and generate reconstructed surface coordinates based on the respective spherical coordinates and on the respective spherical-coordinate representations of the surface normals.

19 Claims, 17 Drawing Sheets

(56) References Cited

U.S. PATENT DOCUMENTS

| | | | |
|---|---|---|---|
| 7,098,435 B2* | 8/2006 | Mueller | G01B 11/00 |
| | | | 250/208.1 |
| 7,724,379 B2 | 5/2010 | Kawasaki | |
| 7,912,173 B2* | 3/2011 | Brady | G06T 11/005 |
| | | | 378/2 |
| 7,948,514 B2 | 5/2011 | Sato | |
| 8,165,403 B1* | 4/2012 | Ramalingam | G06T 7/75 |
| | | | 348/511 |
| 8,229,242 B2 | 7/2012 | Veeraraghavan | |
| 8,437,537 B2 | 5/2013 | Chang | |
| 8,619,144 B1 | 12/2013 | Chang | |
| 2005/0036655 A1* | 2/2005 | Lettvin | G01S 3/784 |
| | | | 382/100 |
| 2005/0211885 A1* | 9/2005 | Tobiason | G01D 5/268 |
| | | | 250/231.13 |
| 2006/0072215 A1* | 4/2006 | Nishi | G02B 13/06 |
| | | | 359/708 |
| 2007/0091302 A1 | 4/2007 | Harding | |
| 2010/0289797 A1* | 11/2010 | Tateno | G06T 17/00 |
| | | | 345/419 |
| 2010/0302240 A1* | 12/2010 | Lettvin | G01S 3/784 |
| | | | 345/419 |
| 2012/0268579 A1 | 10/2012 | Zhao | |
| 2013/0176401 A1* | 7/2013 | Monari | H04N 5/2252 |
| | | | 348/47 |
| 2014/0268160 A1* | 9/2014 | Debevec | G01N 21/55 |
| | | | 356/445 |
| 2015/0131090 A1 | 5/2015 | Osumi | |
| 2016/0076878 A1* | 3/2016 | Tin | G01B 11/22 |
| | | | 348/135 |

OTHER PUBLICATIONS

Yair Adato et al., Toward a Theory of Shape from Specular Flow, IEEE, Int. Conference on Computer Vision (ICCV) 2007. pp. 1-8.
Jonathan Balzer et al., Cavlectometry: Towards Holistic Reconstruction of Large Mirror Objects,IEEE Computer Society vol. 1 Dec. 8-11, 2014; Tokyo, Japan.
Thomas Bonfort et al., Voxel Carving for Specular Surfaces, 9th IEEE International Conference on Computer Vision (ICCV '03), Oct. 2003.
Jean-Yves Bouguet, Camera Calibration Toolbox for Matlab, downloaded Jan. 2016. http://www.vision.caltech.edu/bouguetj/calib_doc/.
Nicolas Boumal et al., Manopt, a matlab toolbox for optimization on manifolds, The Journal of Machine Learning Research, vol. 15, No. 1, pp. 1455-1459, Apr. 2014.
Duane C. Brown, Close-Range Camera Calibration, Photogrammetric Engineering Jan. 1971, pp. 855-866.
Visesh Chari et al., A Theory of Refractive Photo-Light-Path Triangulation, CVPR 2013 paper isopen Access version, provided by the computer vision foundation. The authoritative version of this paper is available in IEEE xplore. Jun. 2013. pp. 1438-1445.
Ding Liu et al., Frequency-Based 3D Reconstruction of Transparent and Specular Objects, Jun. 2014.
Miaomiao Liu et al., Specular Surface Recovery from Reflections of a Planar Pattern Undergoing an Unknown Pure Translation, Nov. 2010.
Nathan Matsuda et al., MC3D: Motion Contrast 3D Scanning, Apr. 2015.
Gerard Medioni & Sing Bing Kang eds., Emerging Topics in Computer Vision (Jul. 2004).
Nigel J. W. Morris et al., Reconstructing the Surface of Inhomogeneous Transparent Scenes by Scatter-Trace Photography, Proc. 11th Int. Conf. Computer Vision (ICCV), Oct. 2007.
Shree K. Nayar et al., Specular Surface Inspection Using Structured Highlight and Gaussian Images, IEEE Transactions on Robotics and Automation,vol. 6, No. 2 Apr. 1990.
Michael Oren et al., A Theory of Specular Surface Geometry, International Journal of Computer Vision 24 (2), 105-124 1996.

Matthew O'Toole et al., 3D Shape and Indirect Appearance by Structured Light Transport, Jun. 2014.
Thoma Papadhimitri et al., A New Perspective on Uncalibrated Photometric Stereo, Jun. 2013.
Krishnan Ramnath et al., Multi-View AAM Fitting and Construction, Int J. Comput Vis DOI 10.1007/s 11263-007-0050-3 , Springer Science+Business Media, LLC Mar. 2007.
Stefan Roth et al., Specular Flow and the Recovery of Surface Structure, Jan. 2006.
Johanna Roussel et al. 3d Surface Reconstruction of Plant Seeds by vol. Carving, in British Machine Vision Conference, 2015, Sep. 2015.
Aswin Sankaranarayanan et al., Specular Surface Reconstruction from Sparse Reflection Correspondences, Mitsubishi Electric Research Laboratories http://www.merl.com TR2010-044 Jul. 2010.
Aswin Sankaranarayanan et al., Image Invariants for Smooth Reflective Surfaces, Mitsubishi Electric Research Laboratories, http://www.merl.com TR2010-082 Oct. 2010.
Silvio Savarese et al., Local Analysis for 3D Reconstruction of Specular Surfaces—Part II, California Institute of Technology, Pasadena CA 91200, Feb. 2001.
Steven M. Seitz et al., A Comparison and Evaluation of Multi-View Stereo Reconstruction Algorithms, Proceedings of the 2006 IEEE Computer Society Conference on Computer Vision and Pattern Recognition (CVPR'06), Jun. 2006.
Noah Snavely et al., Modeling the world from Internet photo collections, International Journal of Computer Vision, DOI 10.1007/s 11263-007-0107-3, Springer Science +Business Media, LLC 2007.
Rahul Swaminathan et al., A Perspective on Distortions, Proceedings of the 2003 IEEE Computer Society Conference on Computer Vision and Pattern Recognition, Jun. 2003.
Tongbo Chen et al., Mesostructure from Specularity, Jun. 2006.
Yuanyuan Ding et al., Recovering Specular Surfaces Using Curved Line Images, Jun. 2009.
Andrew W. Fitzgibbon et al., Automatic 3D Model Construction for Turn-Table Sequences, Jun. 1998.
Yannick Francken et al., High Quality Mesostructure Acquisition Using Specularities, CVPR 2008, Jun. 2008.
Clément Godard et al., Multi-view Reconstruction of Highly Specular Surfaces in Uncontrolled Environments, Oct. 2015.
Steven J. Gortler et al., The Lumigraph, Aug. 1996.
James Gregson, Multiview Optical Tomography Datasets Overview, Mar. 2012.
Michael D. Grossberg et al., The Raxel Imaging Model and Ray-Based Calibration, International Journal of Computer Vision 61 (2), 119-137, 2005.
Mohit Gupta et al., Micro Phase Shifting, Jun. 2012.
M. Gupta et al., Structured Light 3D Scanning in the Presence of Global Illumination, Mitsubishi Electric Research Laboratories http://www.merl.com Jun. 2011.
Ivo Ihrke et al., Transparent and Specular Object Reconstruction, Computer Graphics forum vol. 29, No. 8 pp. 2400-2426, Dec. 2010.
Bastien Jacquet et al., Real-World Normal Map Capture for Nearly Flat Reflective Surfaces, Computer Vision Foundation. ICCV, Dec. 2013.
Achuta Kadambi et al., Polarized 3D: High-Quality Depth Sensing with Polarization Cues, Computer Vision Foundation. ICCV, Dec. 2015.
Seth Koterba et al., Multi-view AAM Fitting and Camera Calibration, IEEE International Conference on Computer Vision, vol. 1, pp. 511-518, 2005, Oct. 2005.
Kiriakos N. Kutulakos et al., A Theory of Refractive and Specular 3D Shape by Light-Path Triangulation, Oct. 2005.
Douglas Lanman et al., Polarization Fields: Dynamic Light Field Display using Multi-Layer LCDs, Dec. 2011.
Aldo Laurentini, The Visual Hull Concept for Silhouette-Based Image Understanding, IEEE transactions on pattern analysis and machine intelligence vol. 16 No. 2, Feb. 1994.
Marc Levoy et al., The Digital Michelangelo Project: 3d Scanning of Large Statues, Computer Graphics and Interactive Techniques, pp. 131-144,2000, Jul. 2000.
Ariel Tankus et al., Photometric Stereo under Perspective Projection, Oct. 2005.

(56) References Cited

OTHER PUBLICATIONS

Marco Tarini et al., 3D Acquisition of Mirroring Objects Using Striped Patterns,www.sciencedirect.com, graphical Models 67, 233-259 Feb. 2005.
Borom Tunwattanapong et al., Acquiring Reflectance and Shape from Continuous Spherical Harmonic Illumination, ACM TOG 32(4) Jul. 2013.
Michael Weinmann et al., Multi-View Normal Field Integration for 3D Reconstruction of Mirroring Objects, ICCV2013, Dec. 2013.
Gordon Wetzstein et al., Hand-Held Schlieren Photography with Light Field Probes, Aug. 2013.
Gordon Wetzstein et al., Layered 3D: Tomographic Image Synthesis for Attenuation-based Light Field and High Dynamic Range Displays, Proceedings of ACM SIGGRAPH 2011, Jul. 2011.
Gordon Wetzstein et al., Refractive Shape from Light Field Distortion, ICCV 2011, Nov. 2011.
Gordon Wetzstein et al., Tensor Displays: Compressive Light Field Synthesis using Multilayer Displays with Directional Backlighting, SIGGRAPH 2012, Aug. 2012.
Tao Xian et al., New dynamic zoom calibration technique for a stereo-vision based multi-view 3D modeling system, Dec. 2004.
Anthony J. Yezzi et al., Structure From Motion for Scenes Without Features, Jun. 2003.

\* cited by examiner

DEVICES, SYSTEMS, AND METHODS FOR RECONSTRUCTING THE THREE-DIMENSIONAL SHAPES OF OBJECTS

CROSS-REFERENCE TO RELATED APPLICATIONS

This application claims the benefit of U.S. Application No. 62/433,088, which was filed on Dec. 12, 2016, and the benefit of U.S. Application No. 62/450,888, which was filed on Jan. 26, 2017.

BACKGROUND

Technical Field

This application generally relates to measuring and reconstructing the shapes of physical objects, including objects that have specular surfaces.

Background

Objects that are composed of a highly-glossy material, such as specular objects, have reflection characteristics that differ from objects that are composed of a diffuse material. For example, a diffuse material reflects light from a directional light source in virtually all directions, but a highly-glossy material reflects light from a directional light source primarily in only one direction or a few directions. These reflections from a highly-glossy material are specular reflections and are caused by the shiny surface of the highly-glossy material, which often has a mirror-like surface finish.

SUMMARY

Some embodiments of a device comprise one or more computer-readable storage media and one or more processors that are coupled to the one or more computer-readable media. The one or more processors are configured to cause the device to obtain encoded images of an object; generate respective light-modulating-device-pixel indices for areas of the images based on the encoded images; generate respective coordinates of points on the object based on the light-modulating-device-pixel indices; generate respective surface normals at the points based on the light-modulating-device-pixel indices; map the respective coordinates of the points to a spherical image sensor, thereby producing respective spherical-coordinate representations of the points; generate spherical-coordinate representations of the respective surface normals based on the spherical coordinates of the points; and generate reconstructed surface coordinates based on the spherical-coordinate representations of the respective surface normals.

Some embodiments of a method comprise obtaining respective surface normals for points on an object, mapping the surface normals to a spherical image sensor, and generating reconstructed surface coordinates based on the surface normals that have been mapped to the spherical image sensor.

Some embodiments of one or more computer-readable media store instructions that, when executed by one or more computing devices, cause the one or more computing devices to perform operations that comprise obtaining respective spherical coordinates of points on an object, obtaining respective spherical-coordinate representations of surface normals at the points on the object, and generating reconstructed surface coordinates based on the respective spherical coordinates and on the respective spherical-coordinate representations of the surface normals.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
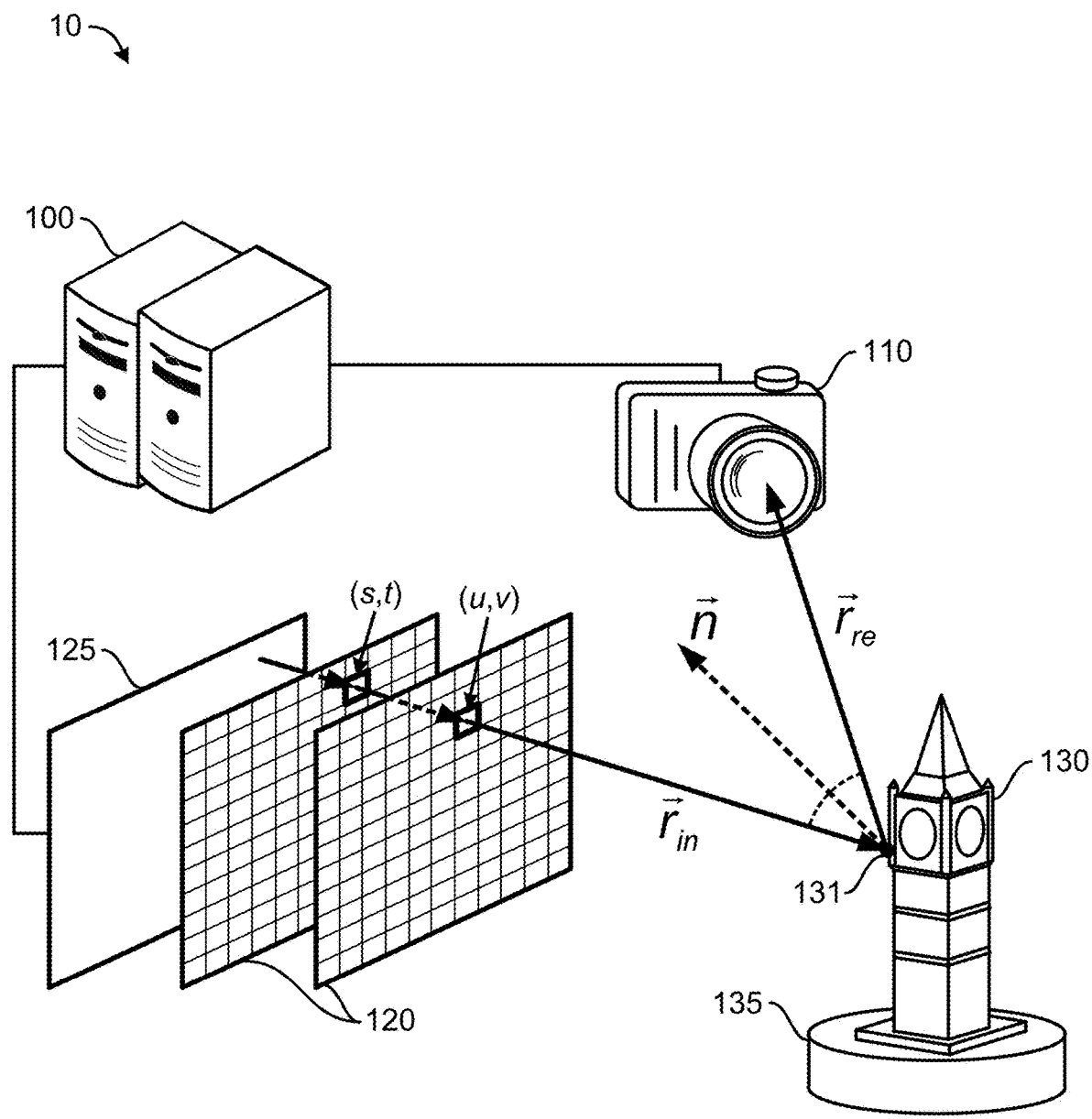
FIG. 1 illustrates an example embodiment of a system for measuring and reconstructing the shape of an object.

FIG. 1 illustrates an example embodiment of a system for measuring and reconstructing the shapes of objects (also referred to herein as a "measurement system"). The measurement system 10 includes one or more measurement devices 100, each of which is a specially-configured computing device (e.g., a specially-configured desktop computer, a specially-configured laptop computer, a specially-configured server); an image-capturing device 110; two or more light-modulating devices (LMDs) 120; and one or more light sources 125. The measurement system 10 generates a digital representation of the shape of an object 130, and the object 130 may be a specular object. The digital representation is a reconstruction of the object 130, and the digital representation may be a set of three-dimensional points (e.g., a point cloud) or a set of surface normal vectors (also referred to herein as "surface normals"). For example, FIG. 1 illustrates the surface normal n of a point 131 on the surface of the object 130. A set of surface normals may be described by a normal field.

In this embodiment, the light-modulating devices 120 are electronically-controllable light-diffusing panels, which are electronically controllable between a transparent mode and a diffuse mode. An example of an electronically-controllable light-diffusing panel is a liquid-crystal display (LCD) panel, which has programmable pixels that modulate a backlight. Another example of an electronically-controllable light-diffusing panel is electrochromic glass. Electrochromic glass includes a layer that has light-transmission properties that are switchable between a transparent mode, in which the layer is completely or almost completely transparent, and a diffuse mode, in which the layer assumes a frosted or opaque appearance.

The light source 125 may provide uniform or nearly-uniform area illumination, for example when the light source 125 is a panel that is composed of a high density of light-producing pixels. In some embodiments, the light source 125 is a backlight from a common display device (e.g., an LCD display, and LED display). Also, in some embodiments, the light source 125 is an imaging projector that has programmable, luminous pixels.

The light source 125 and the light-modulating devices 120 output light rays $\vec{r}$. As described herein, a light ray $\vec{r}$ includes two components: an illumination light ray $\vec{r}_{in}$, which travels from the light source 125 through the light-modulating devices 120 to the surface of the object 130, and a reflected light ray $\vec{r}_{re}$, which is the reflection of the illumination light ray $\vec{r}_{in}$ from the surface of the object 130. Each light ray $\vec{r}$, its illumination light ray $\vec{r}_{in}$, and its reflected light ray $\vec{r}_{re}$ may be described or identified by the intersections of the illumination light ray $\vec{r}_{in}$ with the two light-modulating devices 120. For example, a light ray $\vec{r}$ is described by [u, v] and [s, t] in FIG. 1. Also, the light source 125 and the light-modulating devices 120 may output illumination light rays $\vec{r}_{in}$ in one or more illumination patterns. An illumination pattern may code a sparse subset of the set of light rays that can be generated by the light source 125 and the light-modulating devices 120 to those light rays that can actually reach the object 130 or a bounding volume around the object 130.

The image-capturing device 110 captures the reflected light ray $\vec{r}_{re}$. The reflected light ray $\vec{r}_{re}$ and the illumination light ray $\vec{r}_{in}$ are both part of the same light ray $\vec{r}$, and the reflected light ray $\vec{r}_{re}$ is composed of light from the illumination light ray $\vec{r}_{in}$ that has been reflected from a point 131 on the surface of the object 130. The image-capturing device 110 generates an image from captured reflected light rays $\vec{r}_{re}$. A light-modulating-device-pixel (LMD-pixel) index of the region (e.g., one pixel, a contiguous set of pixels) of the captured image that includes the point 131 on the surface describes the two LMD pixels that transmitted the light ray $\vec{r}$ between the light source 125 and the point 131. In this example, the light-modulating-device-pixel index includes pixel (s, t) and pixel (u, v) in the region of the image that includes the point 131. The LMD-pixel indices of an image may be represented by one or more index maps.

FIG. 1 also illustrates the surface normal $\vec{n}$ of the point 131 on the surface of the object 130 that reflected the illumination light ray $\vec{r}_{in}$.

Furthermore, because information about the shape of the object 130 is obtained by capturing reflections from it, and because the reflections are viewpoint dependent, in order to recover the full surface of the object 130, the measurement system 10 can observe the object's reflections from multiple points of view (viewpoints), for example by using one or more additional image-capturing devices 110 or by observing the object 130 in different poses (e.g., by rotating the object). In the example embodiment of FIG. 1, the object 130 is placed on a rotating stage 135, which is a stage that is capable of rotating, and the object 130 is rotated to capture reflections from the object 130 from multiple viewpoints. Also, some embodiments of the measurement system 10 use curved light-modulating devices 120 to partially or completely surround the object 130 in order to obtain greater reflection coverage.

The measurement system 10 may calibrate the positions of the light-modulating devices 120 and the image-capturing device 110, as well as the rotating stage 135 in embodiments that include the rotating stage 135. In some embodiments, the calibration procedure includes generating calibration information, such as one or more transformations (e.g., one or more transformation matrices). A transformation may define a rotation and a translation from an image-capturing device 110 to a rotating stage 135, from an image-capturing device 110 to an object 130, from an image-capturing device 110 to a light source 125, or from an image-capturing device 110 to a light-modulating device 120. Also, a transformation may define a rotation and a translation between different poses of the object 130. For example, some embodiments of the measurement system 10 generate the calibration information as described in U.S. patent application Ser. No. 15/279,130.

The example embodiment of a measurement system 10 in FIG. 1 captures images of the object 130 from multiple viewpoints by fixing the position of the image-capturing device 110 and rotating the object 130 on the rotating stage 135. The one or more measurement devices 100 decode images of the object 130 to identify respective LMD-pixel indices of captured light rays that were reflected by the object 130, calculate respective surface normals and coordinates of points on the surface of the object 130, and combine the surface normals or coordinates from different images into a single collection of surface normals or coordinates. For example, the one or more measurement devices 100 can use ray triangulation with these images to generate a set of surface coordinates (e.g., a point cloud) or a corresponding normal field (e.g., a surface-normal-vector map) for each viewpoint of the object 130. Using the axis of rotation and the rotation angles, these surface coordinates or normal fields can be merged into one set of surface coordinates (e.g., one point cloud) or one normal field by applying simple rotations.

Some embodiments of the one or more measurement devices 100 use a spherical-coordinate system to combine the coordinates of the points on the surface of the object or to combine the surface normals. For example, because the respective surface normals or the respective coordinates in each image may be scaled differently, when combining the surface normals or coordinates, the one or more measurement devices 100 may bring the respective surface normals or coordinates from the different images into a uniform scale.

Figure 2:
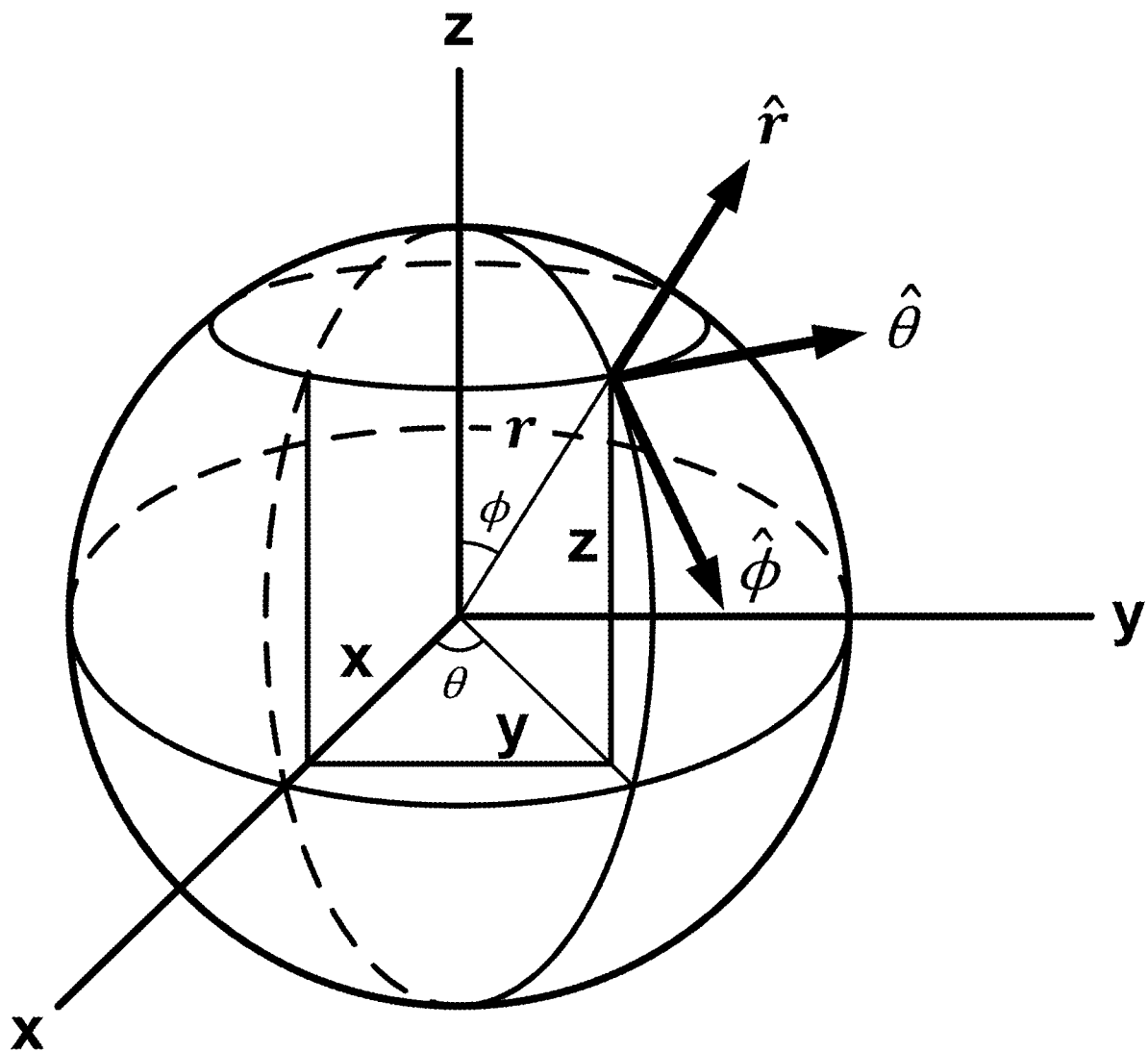
FIG. 2 illustrates an example embodiment of a spherical-coordinate system.

FIG. 2 illustrates an example embodiment of a spherical-coordinate system. In spherical coordinates, any three-dimensional (3D) point can be represented by the triplet (r, θ, φ), where r is the distance of the point from the origin, where θ is the azimuthal angle in the x-y plane from the x-axis, and where φ is the polar angle from the positive z-axis. Also, r, θ, and φ satisfy the following constraints: r ∈ [0, ∞), θ ∈ [0,2π), and φ ∈ [0, π).

A point (x, y, z) in the traditional Cartesian coordinate system can be converted to spherical coordinates as follows:

$$r = \sqrt{x^2 + y^2 + z^2}, \quad (1)$$

$$\theta = \tan^{-1}\left(\frac{y}{x}\right), \text{ and} \quad (2)$$

$$\phi = \cos^{-1}\left(\frac{z}{r}\right). \quad (3)$$

Any vector can be represented as a linear combination of three mutually-orthogonal unit vectors, $\hat{r}$, $\hat{\theta}$, and $\hat{\phi}$, which are the unit vectors in spherical coordinates. At any point in space, unit vector $\hat{r}$ points in the radially outward direction, unit vector $\hat{\phi}$ is perpendicular to unit vector $\hat{r}$ and points in the direction of increasing polar angle φ, and unit vector $\hat{\theta}$ points in the direction of increasing azimuthal angle θ and is orthogonal to both unit vector $\hat{r}$ and unit vector $\hat{\phi}$. For example, vector $\vec{V}$ can be represented in terms of these unit vectors as described by the following:

$$\vec{V} = V_r \hat{r} + V_\theta \hat{\theta} + V_\phi \hat{\phi}, \quad (4)$$

where $V_r$, $V_\theta$, and $V_\phi$ are the components of $\vec{V}$ along unit vector $\hat{r}$, unit vector $\hat{\theta}$, and unit vector $\hat{\phi}$, respectively.

Let the unit vectors in Cartesian coordinates along the x-axis, y-axis and z-axis be unit vector $\hat{x}$, unit vector $\hat{y}$, and unit vector $\hat{z}$, respectively. If the components of a vector $\vec{V}$ along these axes are $V_x$, $V_y$, and $V_z$, then the vector $\vec{V}$ can be represented as follows:

$$\vec{V} = V_x \hat{x} + V_y \hat{y} + V_z \hat{z}. \quad (5)$$

The representation of this vector $\vec{V}$ can be converted to a representation that uses spherical coordinates, for example as described by the following:

$$V_r = V_x \cos(\theta)\sin(\phi) + V_y \sin(\theta)\sin(\phi) + V_z \cos(\phi), \quad (6)$$

$$V_\theta = -V_x \sin(\theta) + V_y \cos(\theta), \text{ and} \quad (7)$$

$$V_\phi = V_x \cos(\theta)\cos(\phi) + V_y \sin(\theta)\cos(\phi) - V_z \sin(\phi). \quad (8)$$

Some embodiments of the measurement system 10 convert the representations of any coordinates and surface normals to representations in spherical coordinates, for example using the conversions described above. Furthermore, the remainder of this description presents all derivations in a spherical-coordinate system. Additionally, the following description uses a point cloud to represent a collection of coordinates, although some embodiments of the measurement system 10 use another representation of a collection of coordinates.

Figure 3:
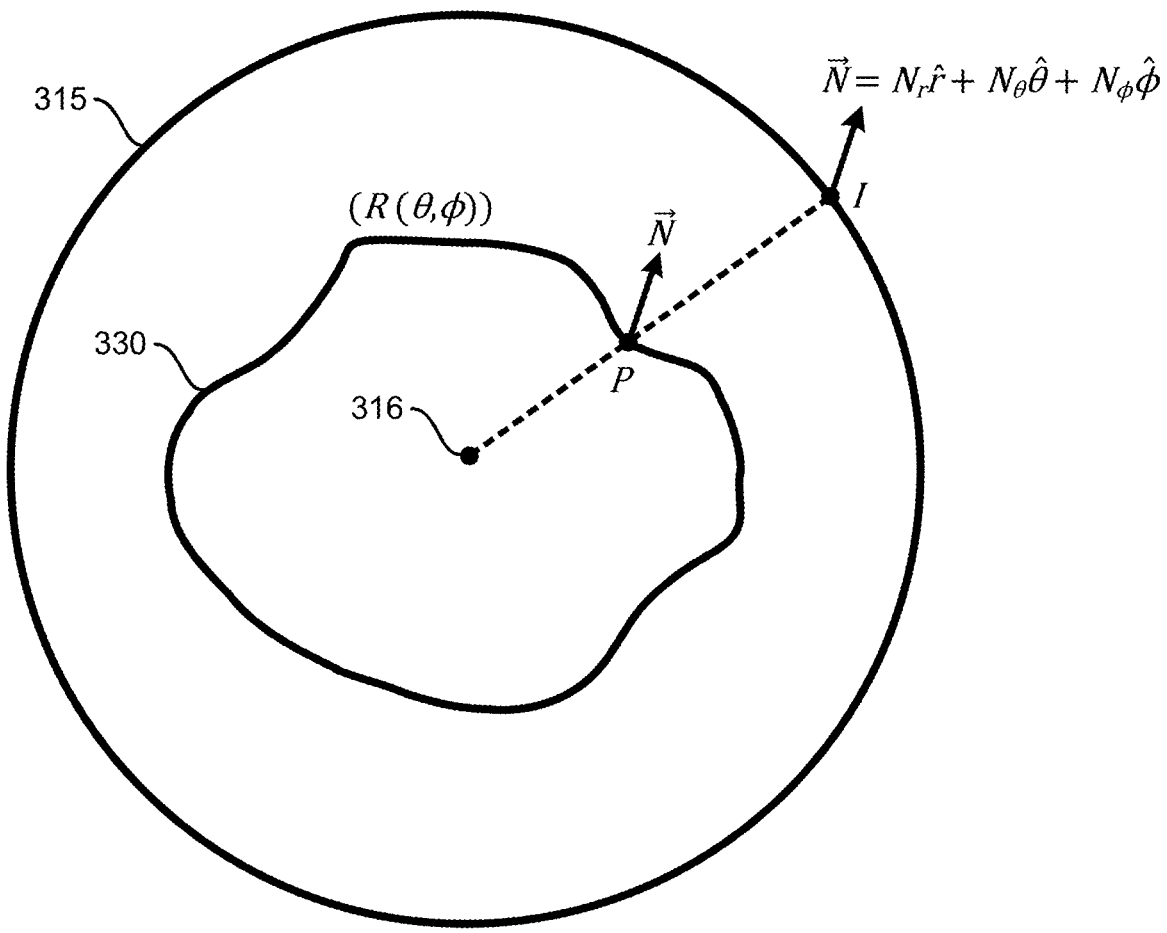
FIG. 3 illustrates a framework in which a three-dimensional object is enclosed by a spherical image sensor.

FIG. 3 illustrates a framework in which a three-dimensional object 330 is enclosed by a spherical image sensor 315. Let the center of this sphere be denoted as the center of projection 316. The spherical image sensor 315 can be divided into small pixels, each of which is identified by its azimuthal angle θ and its polar angle φ, as measured from the center of projection 316. The spherical image sensor 315 completely encloses the object 330.

The mapping from the object's surface to the spherical image sensor 315 can be achieved by radially projecting each point on the surface of the object 330 onto the spherical image sensor 315. As a result, both the surface point as well as the pixel to which it is mapped have the same azimuthal angle θ and the same polar angle φ. In the spherical-coordinate system, this mapping is an orthographic projection.

Let P be a point on the surface of the object that has three-dimensional coordinates (r, θ, φ). This surface point P is projected radially onto the surface of the spherical image sensor 315 by extending the line connecting the center of projection 316 and the surface point P to meet the surface of the spherical image sensor 315, as shown in FIG. 3. Because this projection is radially outwards, the pixel l of the spherical image sensor 315 to which the surface point P is mapped has the same azimuthal angle θ and the same polar angle φ. Thus, in spherical coordinates, the mapping from the surface of the object 330 to the pixels on the spherical image sensor 315 is an orthographic projection.

Given the point cloud of the object 330, a suitable center of projection (e.g., the centroid of the point cloud) can be selected, such as the center of projection 316 that is shown in FIG. 3. Using the center of projection 316, each point in the point cloud can be mapped onto a spherical image sensor 315 (e.g., an imaginary spherical image sensor) of unit radius. This is conceptually equivalent to capturing an image of the object 330 using the spherical image sensor 315.

The surface of the three-dimensional object 330 can be completely described by specifying the radial distance of the surface points from the origin at each azimuthal angle θ and polar angle φ. Consequently, the radial distance R of the surface points of the object 330 can be modeled as a function of the azimuthal angle θ and the polar angle φ. The task of determining the object's shape reduces to finding the surface function R(θ, φ). The surface point P of the object 330 that maps to an image pixel l has the coordinates (R(θ, φ), θ, φ), although the surface function R(θ, φ) may need to be determined.

Consider an image pixel l with an azimuthal angle θ and a polar angle φ. Let $\vec{N}$ be the surface normal that is associated with this pixel. Let $N_r$, $N_\theta$, and $N_\phi$ be the components of the surface normal $\vec{N}$ along vector $\hat{r}$, vector $\hat{\theta}$, and vector $\hat{\phi}$, respectively. The surface normal $\vec{N}$ can be described as follows:

$$\vec{N} = N_r \hat{r} + N_\theta \hat{\theta} + N_\phi \hat{\phi}. \quad (9)$$

The surface normal $\vec{N}$ at point P on the surface of the object 330 can also be expressed in terms of the gradient of the surface function R(θ, φ). In the spherical-coordinate system, the surface normal $\vec{N}$ can be expressed as follows:

$$\vec{N} = (-1)\hat{r} + \left(\frac{1}{R\sin(\phi)} \frac{\partial R}{\partial \theta}\right)\hat{\theta} + \left(\frac{1}{R} \frac{\partial R}{\partial \phi}\right)\hat{\phi}. \quad (10)$$

Expressing equation (9) in the form of equation (10) yields the following expression of the surface normal $\vec{N}$ that is associated with a pixel:

$$\vec{N} = (-1)\hat{r} + \left(-\frac{N_\theta}{N_r}\right)\hat{\theta} + \left(-\frac{N_\phi}{N_r}\right)\hat{\phi}. \quad (11)$$

Equating the corresponding components of the surface normal $\vec{N}$ in equation (10) and equation (11) produces the following partial differential equations:

$$\frac{1}{R}\frac{\partial R}{\partial \theta} = -\frac{N_\theta}{N_r}\sin(\phi), \text{ and} \quad (12)$$

$$\frac{1}{R}\frac{\partial R}{\partial \phi} = -\frac{N_\phi}{N_r}. \quad (13)$$

These equations can be further simplified by using the following substitution: $g(\theta, \phi) = \log(R(\theta, \phi))$. Note that this implicitly assumes that $R(\theta, \phi) > 0$. This is valid because the center of projection 316 can be selected such that it does not lie on the surface of the object 330. Accordingly, the partial differential equations can be described as follows:

$$\frac{\partial g}{\partial \theta} = -\frac{N_\theta}{N_r}\sin(\phi), \text{ and} \quad (14)$$

$$\frac{\partial g}{\partial \phi} = -\frac{N_\phi}{N_r}. \quad (15)$$

Figure 4:
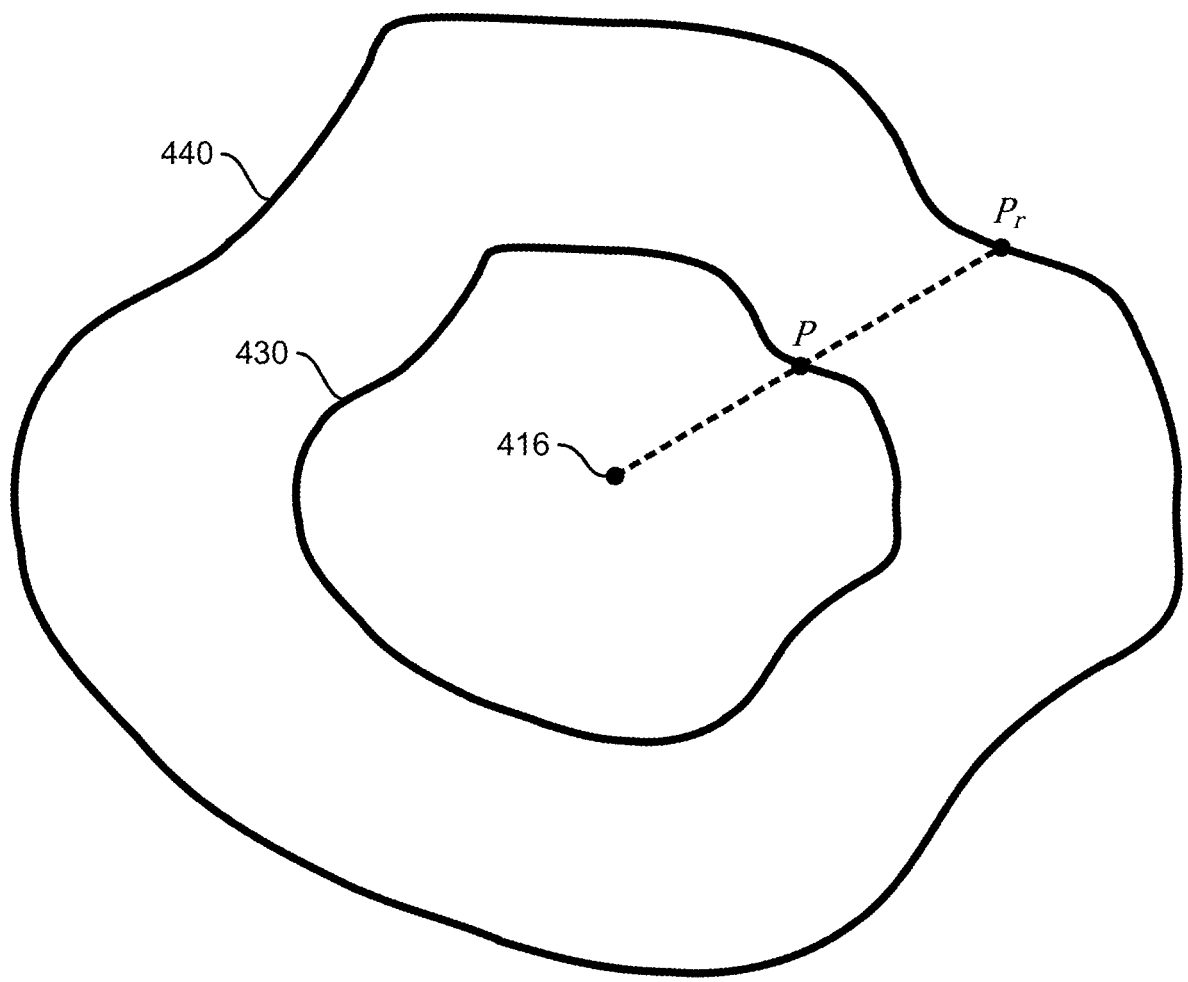
FIG. 4 illustrates an example embodiment of a reconstructed point cloud and a ground-truth surface.

FIG. 4 illustrates an example embodiment of a reconstructed point cloud and a ground-truth surface. To produce the reconstructed point cloud 440, which reconstructs the shape of the ground-truth surface 430, the partial differential equations in equations (14)-(15) can be solved numerically to yield $g(\theta, \phi)$. And $R(\theta, \phi)$ can be calculated as follows:

$$R(\theta, \phi) = e^{g(\theta, \phi)}. \quad (16)$$

Note that the function $g(\theta, \phi)$ can be determined only up to a constant value c. Therefore, $$R(\theta, \phi) = e^{(g(\theta, \phi) + c)}, \quad (17)$$

$$R(\theta, \phi) = e^c e^{g(\theta, \phi)}, \text{ and} \quad (18)$$

$$R(\theta, \phi) = k e^{g(\theta, \phi)}, \quad (19)$$

where $k = e^c$ is a scale ambiguity. Thus, if point P on the surface of the object 430 has the coordinates $(R(\theta, \phi), \theta, \phi)$, then the coordinates of point P's reconstruction $P_r$ can be described by $(ke^{g(\theta, \phi)}, \theta, \phi)$.

In some embodiments, because the spherical-normal-vector integration reconstructs the entire object 430 in one pass or iteration, there is only a single scale ambiguity k to be resolved. This can be done by determining the ground truth for one point on the surface of the object 430.

Figure 5:
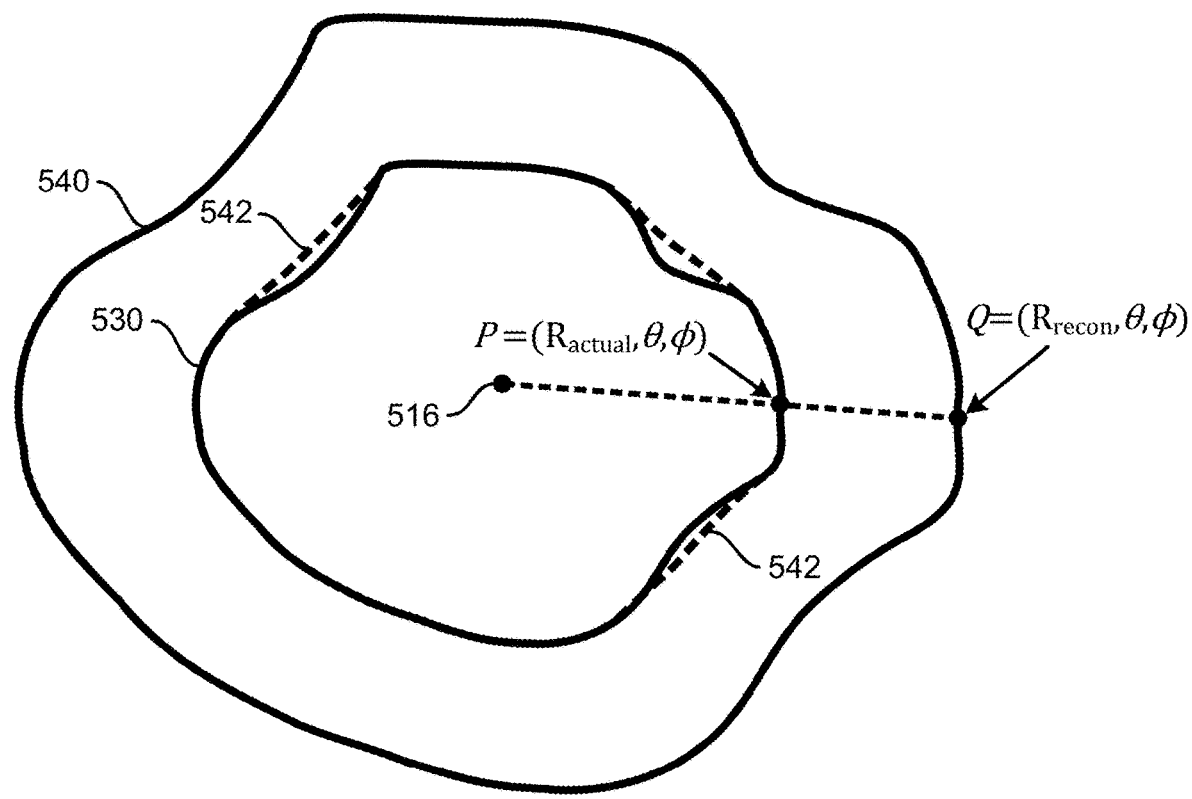
FIG. 5 illustrates an example embodiment of a convex hull, the coordinates of a point on the surface of an object, and the coordinates of a point in the point cloud that has the same azimuthal angle and the same polar angle as the point on the surface of the object.

One technique to measure the ground truth of a point on the object's surface includes determining the object's convex hull. In the regions where the convex hull coincides with the object, the hull is a good estimate of the ground truth. FIG. 5 illustrates an example embodiment of a convex hull 542, the coordinates of a point P on the surface of an object 530, and the coordinates of a point Q in the reconstructed point cloud 540 that has the same azimuthal angle $\theta$ and the same polar angle $\phi$ as the point P on the surface of the object 530.

Consider the point P, which is in a place where the convex hull 542 coincides with the object 530. Let the measured coordinates of this point P be $(R_{actual}, \theta, \phi)$. Let point Q be the corresponding point, which is the point that has the same azimuthal angle $\theta$ and the same polar angle $\phi$, on the reconstructed point cloud 540. Let the radial distance of point Q from the origin be $R_{recon}$. Then the scale factor k can be determined as follows:

$$k = \frac{R_{actual}}{R_{recon}}. \quad (20)$$

The reconstructed point cloud 540 can now be brought to the same scale as the object 530 by multiplying the radial-distance coordinate (R) of each point on the reconstructed point cloud 540 with the scale factor k. Note that the convex hull 542 is just one possible way to determine a ground-truth point. Some embodiments of measurement systems use other methods. Also, in some embodiments, at least one point is necessary to determine the scale factor k. And to account for measurement errors and to increase the robustness of the scale-factor determination, the ground-truth measurement can be extended to a set of points (rather than just a single point). Thus, some embodiments of measurement systems calculate the scale factor k using multiple points on the object (e.g., points on the convex hull 542 where the convex hull 542 coincides with the object 530) and the corresponding points on the reconstructed point cloud 540.

Furthermore, in order to solve partial differential equations (14) and (15) numerically, the surface normal $\vec{N}$ may be sampled on a uniform grid in the $\theta-\phi$ plane. However, in many practical applications, this sampling is not uniform. To solve the partial differential equations (14) and (15), uniformly-sampled data can be obtained from this set of non-uniform, scattered data points.

For example, each component of the surface normals $\vec{N}$ can be modeled as a function of the azimuthal angle $\theta$ and the polar angle $\phi$. This two-dimensional function can be determined by fitting a surface through the available non-uniform samples using Delaunay triangulation. Delaunay triangulation approximates the surface using triangles. The available sample points act as vertices of these triangles. For any point which lies in the interior of a triangle, the function value is obtained through linear interpolation of the function values at the vertices of the triangle. Using this method, uniformly-spaced surface normals $\vec{N}$ can be generated.

However, if each component of the surface normals $\vec{N}$ was interpolated separately, then the surface normals $\vec{N}$ may not be unit length. To rectify this, at each sample point, the surface normal $\vec{N}$ can be divided by its norm. This produces a set of uniformly-spaced, unit-length surface normals $\vec{N}$, which can be used to solve the partial differential equations. Also, these operations can be performed in the Cartesian domain and, once they are finished, all the resulting surface normals $\vec{N}$ can be converted to spherical coordinates.

Figure 6:
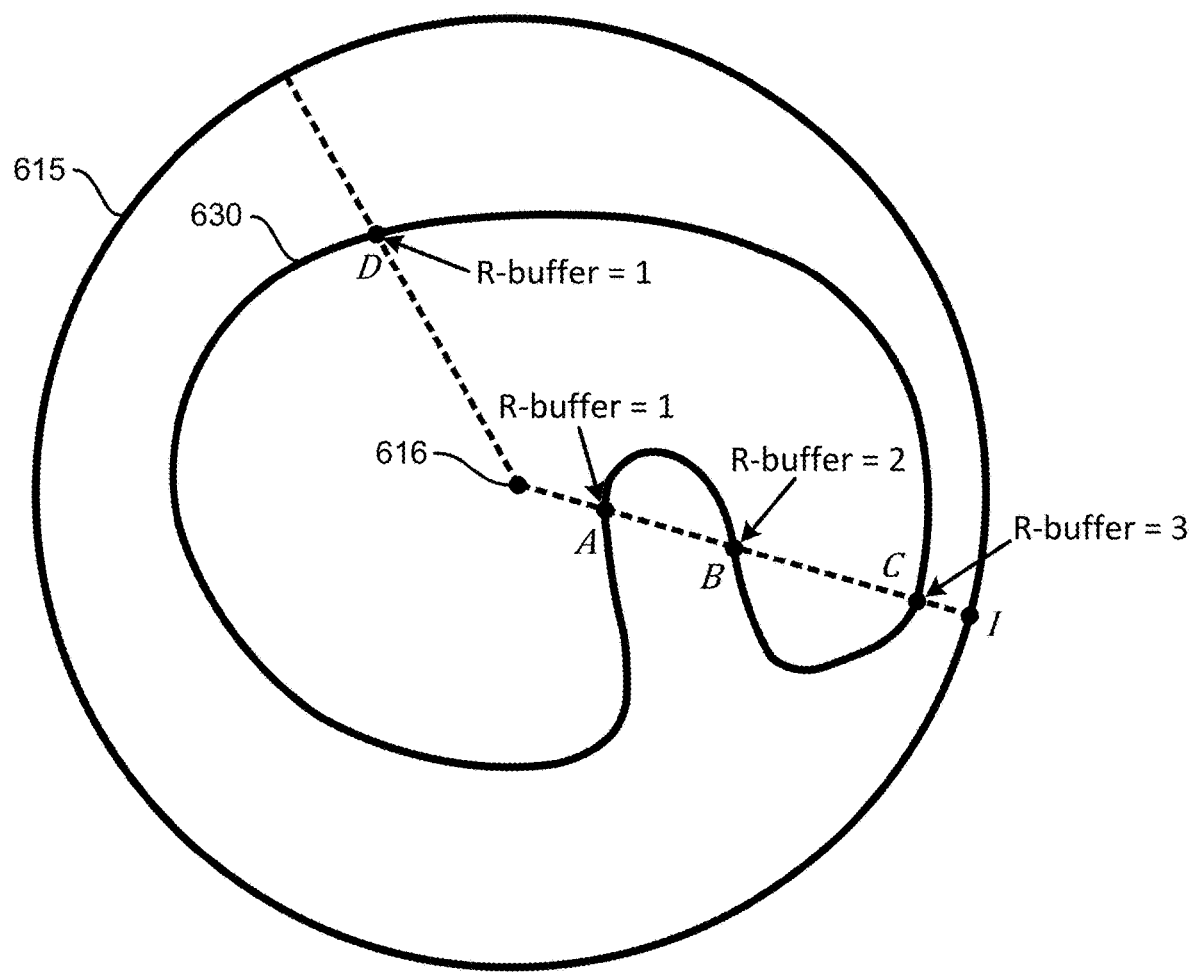
FIG. 6 illustrates an example embodiment of multiple points on an object's surface that can be mapped to the same pixel on a spherical image sensor.

FIG. 6 illustrates an example embodiment of multiple points on an object's surface that can be mapped to the same pixel on a spherical image sensor. As shown in FIG. 6, in some circumstances, multiple points on the surface of an object 630 can be mapped to the same pixel on a spherical image sensor 615. For example, in FIG. 6, points A, B, and C all map to the same image-sensor pixel 1. However, the spherical-normal-vector integration may require a one-toone mapping from the object 630 to the spherical image sensor 615. Therefore, to handle multiple-mapping conditions, some devices, systems, and methods use an R-buffer.

Each point on the surface of the object 630 is associated with an R-buffer value. If the mapping between the pixel of the spherical image sensor 615 (sensor pixel) and the point on the surface is unique (for example, point D in FIG. 6), then the R-buffer value associated with that surface point is set to 1. If multiple surface points map to the same sensor pixel, then the R-buffer value of the point closest to the center of projection 616 is set to 1, the R-buffer value of the next closest point is set to 2, and so on. For example, in FIG. 6, point A is closest to the center of projection 616, and its R-buffer value would be 1. Also, the R-buffer value of point B would be 2, and the R-buffer value of point C would be 3.

Normal-vector integration may be performed using only the points that have the same R-buffer value. Accordingly, points with an R-buffer value of 1 are integrated in the first iteration or pass, points with an R-buffer value of 2 are integrated in the second iteration or pass, and so on. After each iteration or pass of the integration, the scale-factor ambiguity can be resolved. Finally, the results of all of the integration iterations or passes can be combined to produce a single reconstructed point cloud that models the object 630.

Figure 7:
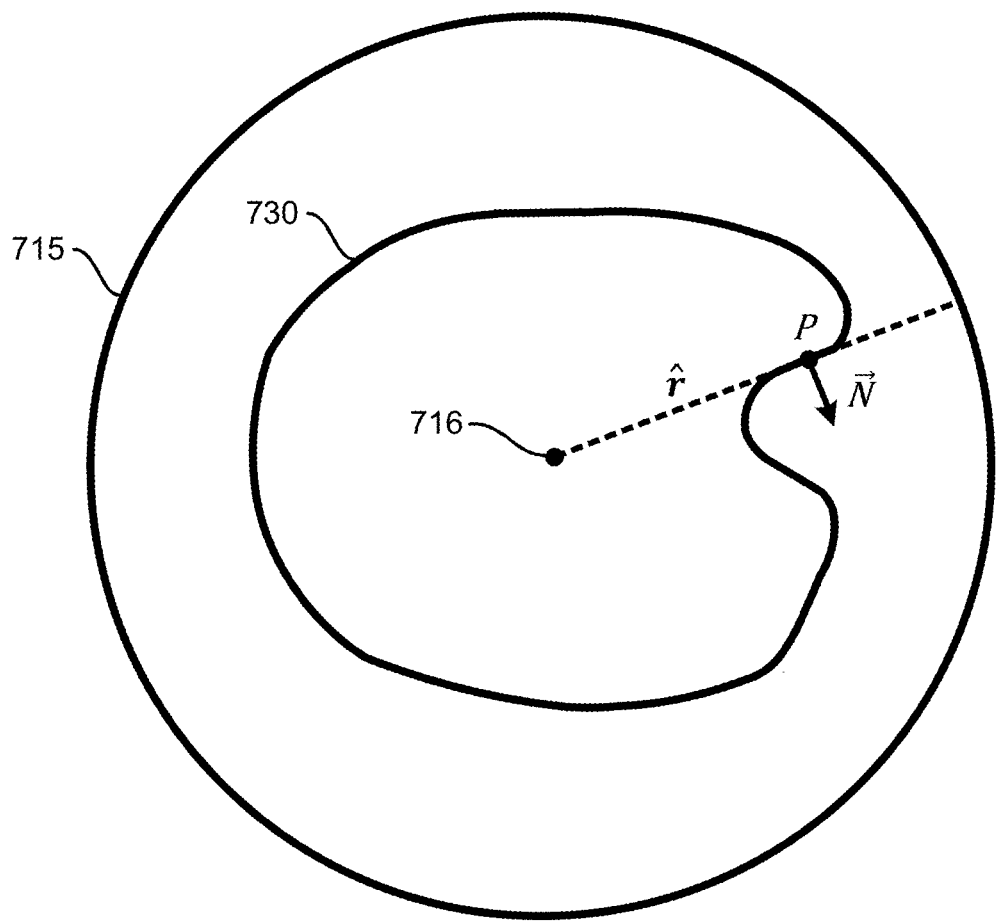
FIG. 7 illustrates an example embodiment of an object that has a point that has a zero component of the surface normal in the radial direction.

FIG. 7 illustrates an example embodiment of an object that has a point that has a zero component of the surface normal in the radial direction. Operations that can be described by equation (11) will fail if the component of the surface normal along the radial direction is zero (i.e., if $N_r=0$). An example of this is shown in FIG. 7. At point P, the surface normal $\vec{N}$ is orthogonal to the radial-direction vector $\hat{r}$. Therefore, the component of the surface normal $\vec{N}$ along the radial-direction vector $\hat{r}$, which is $N_r$, is zero ($N_r=0$). To prevent division by zero, all such points can be removed while performing normal-vector integration in a first iteration or pass. In a second iteration or pass, the center of projection 716 can be shifted slightly to ensure that the points that were rejected in the first pass do not cause problems again, and then normal-vector integration can be performed again. The scale-factor ambiguity is resolved in the generated point clouds, and the generated point clouds can be combined by reversing the shift in the center of projection 716.

The effectiveness and robustness of three embodiments of measurement systems were tested. In one embodiment, a synthetically-generated ellipsoid was used for quantitative testing. In order to check the performance with more complex models, one embodiment used the Stanford Bunny model, and another embodiment used a horse model.

Figure 8A:
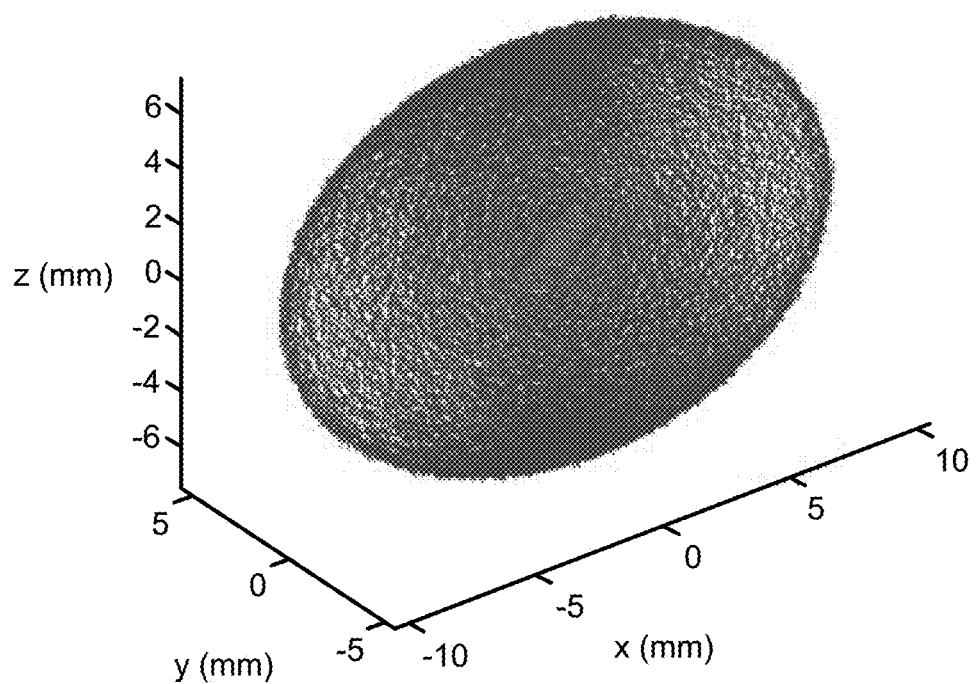
FIG. 8A illustrates a synthetically-generated ellipsoid point cloud.
Figure 8B:
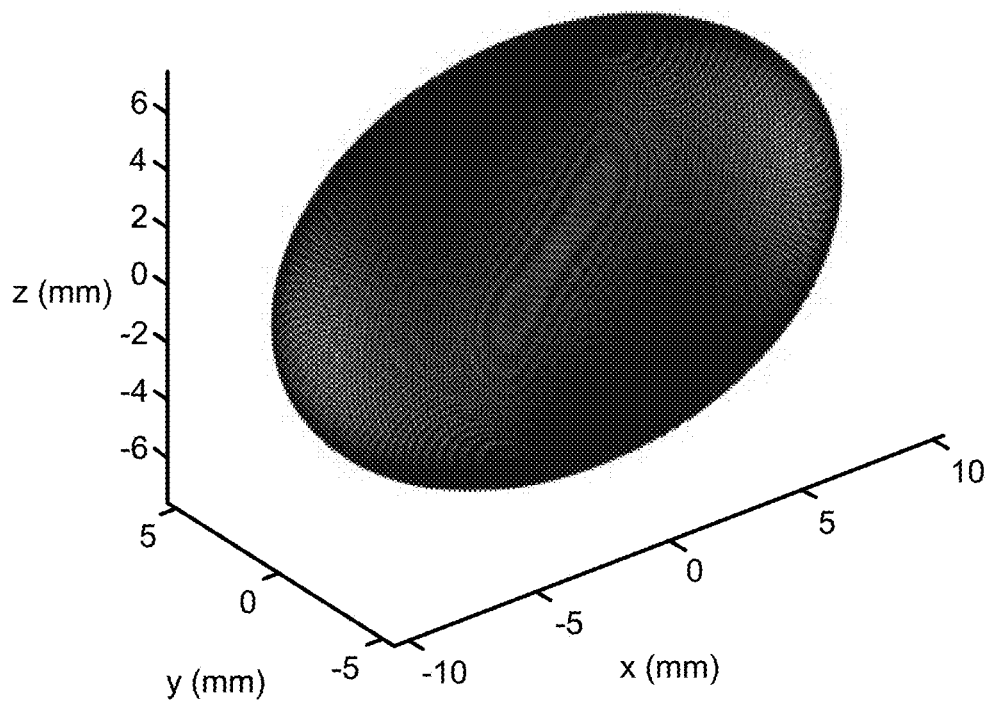
FIG. 8B illustrates a reconstructed ellipsoid point cloud.

FIG. 8A illustrates a synthetically-generated ellipsoid point cloud, which was used as an input. FIG. 8B illustrates a reconstructed ellipsoid, which is an output. The synthetically-generated point cloud, which has the shape of a noisy ellipsoid, and the corresponding normal-vector field of the ellipsoid were generated in MATLAB. Each point in the point cloud was mapped to a pixel on a spherical image sensor using the center of the ellipsoid as the center of projection. This helped associate the normal-vector field with pixels on the spherical image sensor. This normal-vector field was input to a spherical-normal-vector-integration algorithm, and the synthetically-generated point cloud served as the ground-truth object. Using the algorithm, the embodiment of a measurement system reconstructed the 3D shape of the ellipsoid. One ground-truth point was used to ensure that the reconstructed point cloud, which is shown in FIG. 8B, was the same scale as the ground-truth object, which is the synthetically-generated point cloud in this example.

For quantitative evaluation of the algorithm, the relative RMS error between the reconstructed point cloud in FIG. 8B and the ground truth point cloud in FIG. 8A was calculated. In order to test the robustness of an embodiment of the algorithm, Gaussian noise was added to the synthetic point cloud, producing a noisy point cloud. The normal-vector field was left untouched. This noisy point cloud was mapped to a spherical image sensor as before, and the normal-vector integration was performed. Once again, the relative RMS error was calculated. The relative RMS error in the reconstructed point clouds for different noise standard deviations is shown below in Table 1.

In Table 1, a noise standard deviation of zero indicates that no noise was added to the point cloud. The relative RMS error in the reconstructed point cloud (the reconstruction) is just 0.4% when the input point cloud is not noisy. This shows that the reconstruction is very accurate. Even when the noise standard deviation is 0.1, the error is less than 1%. This indicates that the embodiment of the algorithm can be used for de-noising and smoothing noisy point clouds.

TABLE 1

| Noise Standard Deviation | Relative RMS Error (%) |
| --- | --- |
| 0 | 0.4126 |
| 0.01 | 0.71361 |
| 0.1 | 0.53365 |
| 0.5 | 1.2141 |
| 1 | 4.7613 |

Figure 9:
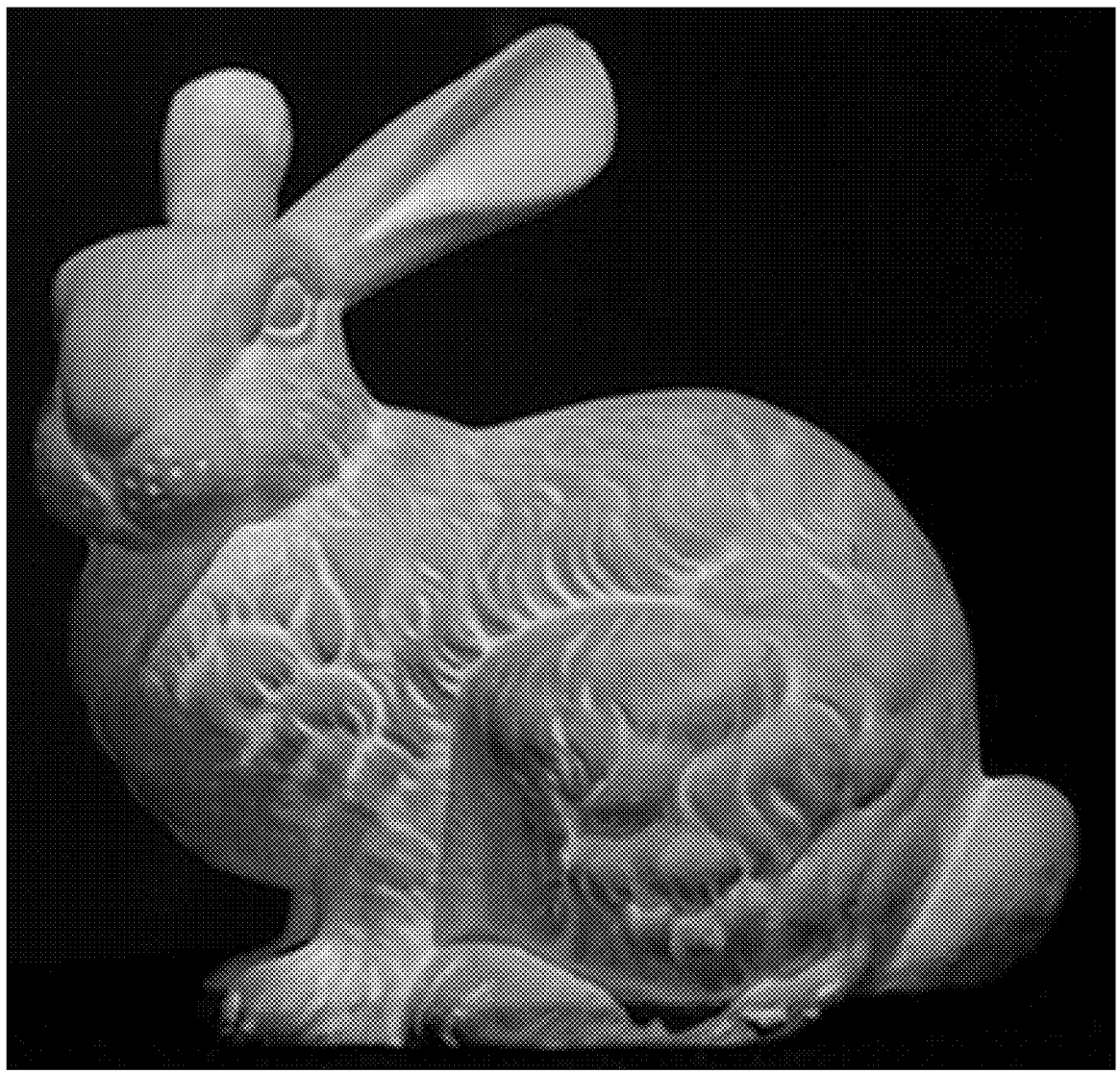
FIG. 9 illustrates an image of the Stanford Bunny.

FIG. 9 illustrates an image of the Stanford Bunny. In order to test the performance of an embodiment of the algorithm with much more complicated objects, the Stanford Bunny was used as a test case. The Stanford Bunny point cloud consists of 35,947 three-dimensional points. The surface normals of the bunny were estimated from the point-cloud data.

Figure 10:
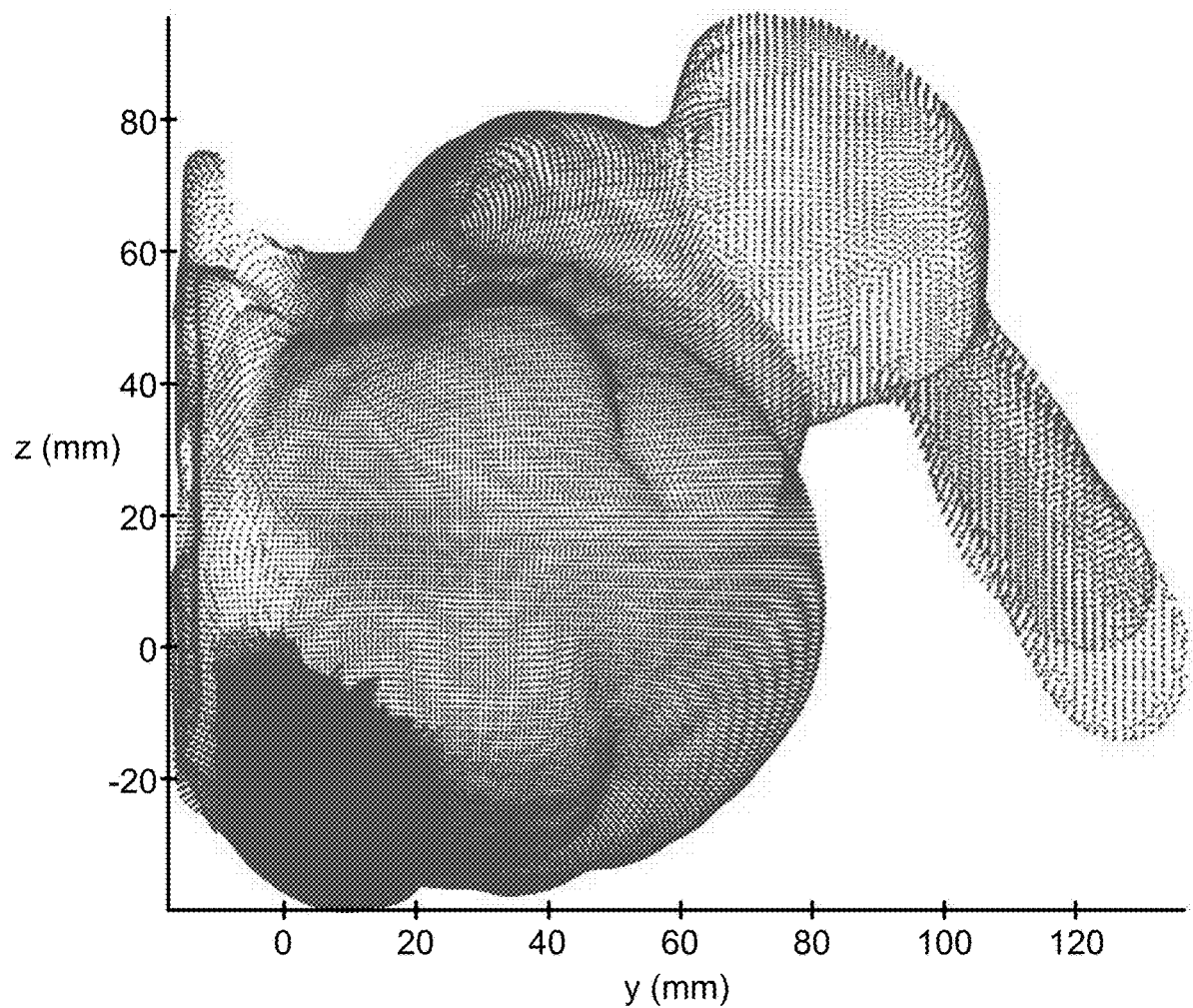
FIGS. 10 and 11 illustrate example embodiments of visualizations of a combined reconstructed point cloud of the Stanford Bunny.
Figure 11:
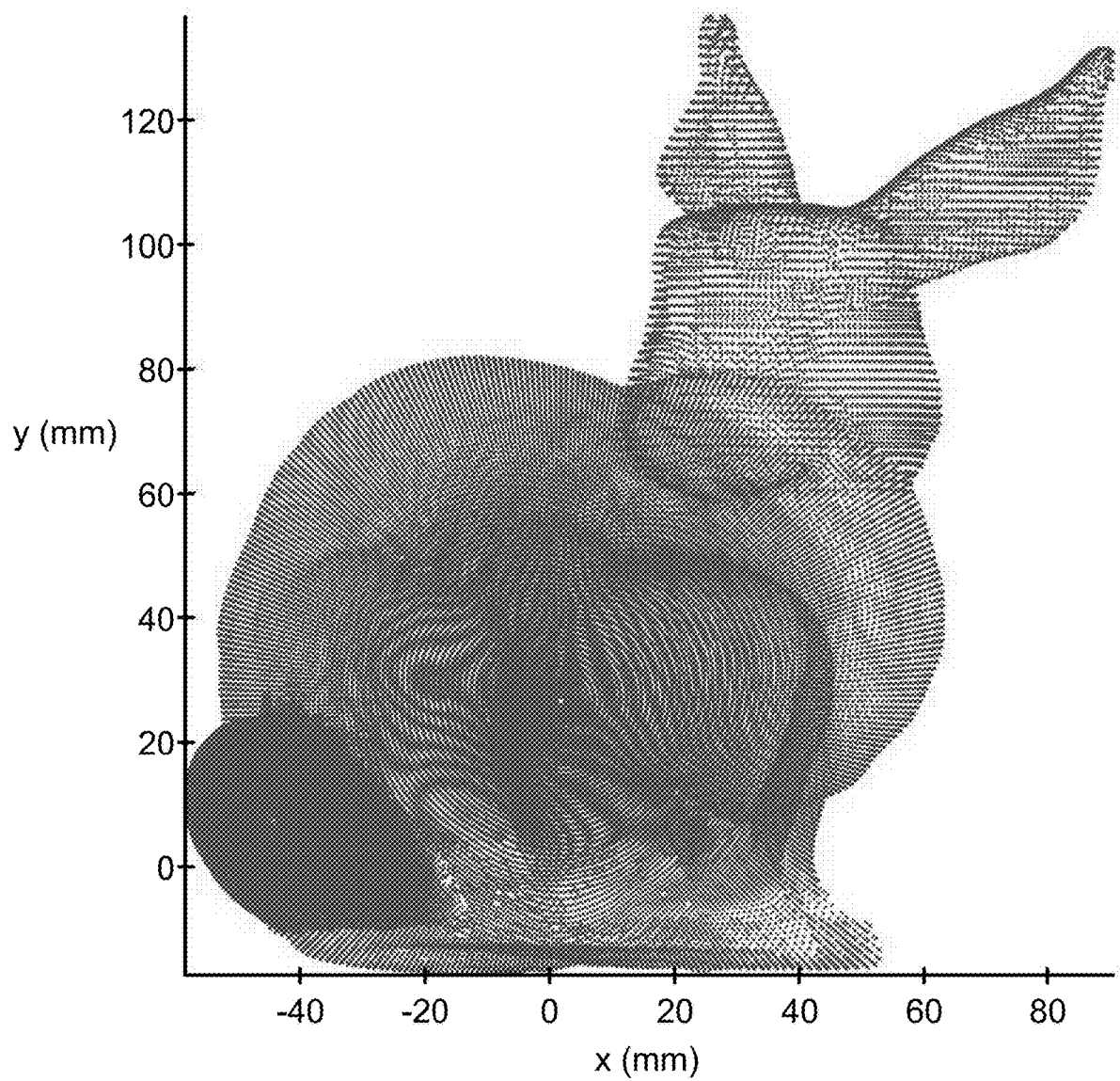

This test case was complicated because of the following complications: (1) In many cases, multiple 3D object points were mapped to the same sensor pixel, and (2) some of the 3D points were degenerate (i.e., the surface normals were perpendicular to the radial direction). To overcome these complications, the point cloud of the bunny was reconstructed in three parts, each of which had a respective center of projection: the head, the body, and the tail. For each part, one ground-truth point was used as a reference in order to calculate the correct scale factor. The three reconstructed point clouds were then combined to form a single reconstructed point cloud. Qualitatively, the reconstructed point clouds closely resemble the ground truth. The embodiment of a reconstruction algorithm was even able to handle problematic concave areas, such as the inner ears of the bunny. FIGS. 10 and 11 illustrate example embodiments of visualizations of the combined reconstructed point cloud of the Stanford Bunny. In these example embodiments, the combined surface coordinates of the points in the point clouds have been converted from spherical coordinates to Cartesian coordinates.

Figure 12A:
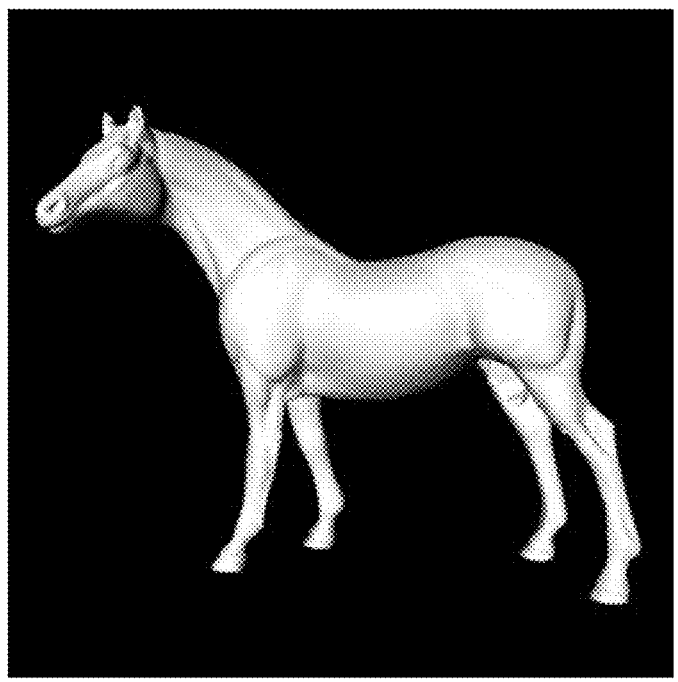
FIG. 12A illustrates an image of an example embodiment of a model of a horse.

FIG. 12A illustrates an image of an example embodiment of a model of a horse. The point cloud of the horse consists of 48,485 three-dimensional points. The surface normals of the horse were estimated from the point-cloud data.

Figure 12B:
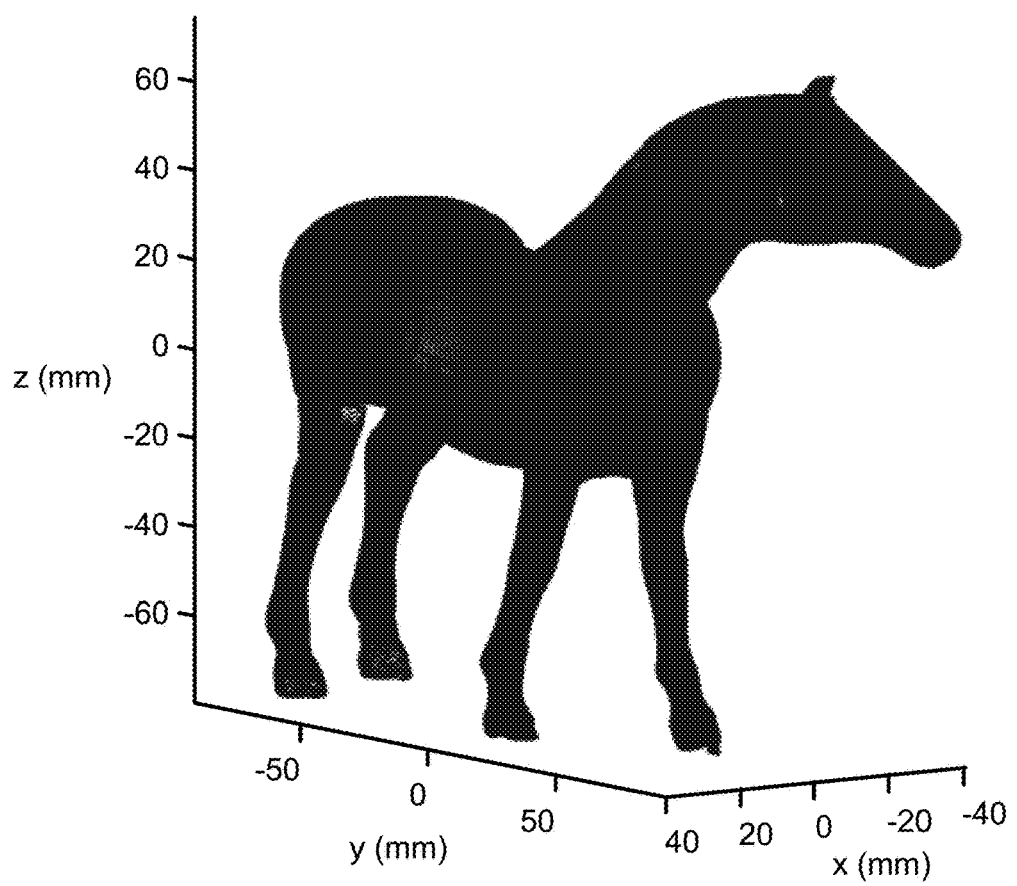
FIG. 12B illustrates an example embodiment of a visualization of the reconstructed point cloud of the horse.

Similar to the Stanford Bunny, this test case was also difficult because of the following complications: (1) In many cases, multiple 3D object points were mapped to the same sensor pixel, and (2) some of the 3D points were degenerate (i.e., the surface normals were perpendicular to the radial direction). To resolve these complications, the point cloud was reconstructed in six smaller point clouds, each of which had a respective center of projection: the head, the body, and the four legs. In each case, one ground-truth point was used as a reference in order to calculate the correct scale factor. The reconstructed smaller point clouds were then combined to form a single reconstructed point cloud. FIG. 12B illustrates an example embodiment of a visualization of the reconstructed point cloud of the horse. Qualitatively, the reconstructed point cloud closely resembles the ground-truth horse. The only visible difference is that the ears of the horse in the reconstructed point cloud are smaller because the tips of the ears have been smoothed due to the reconstruction.

Figure 13:
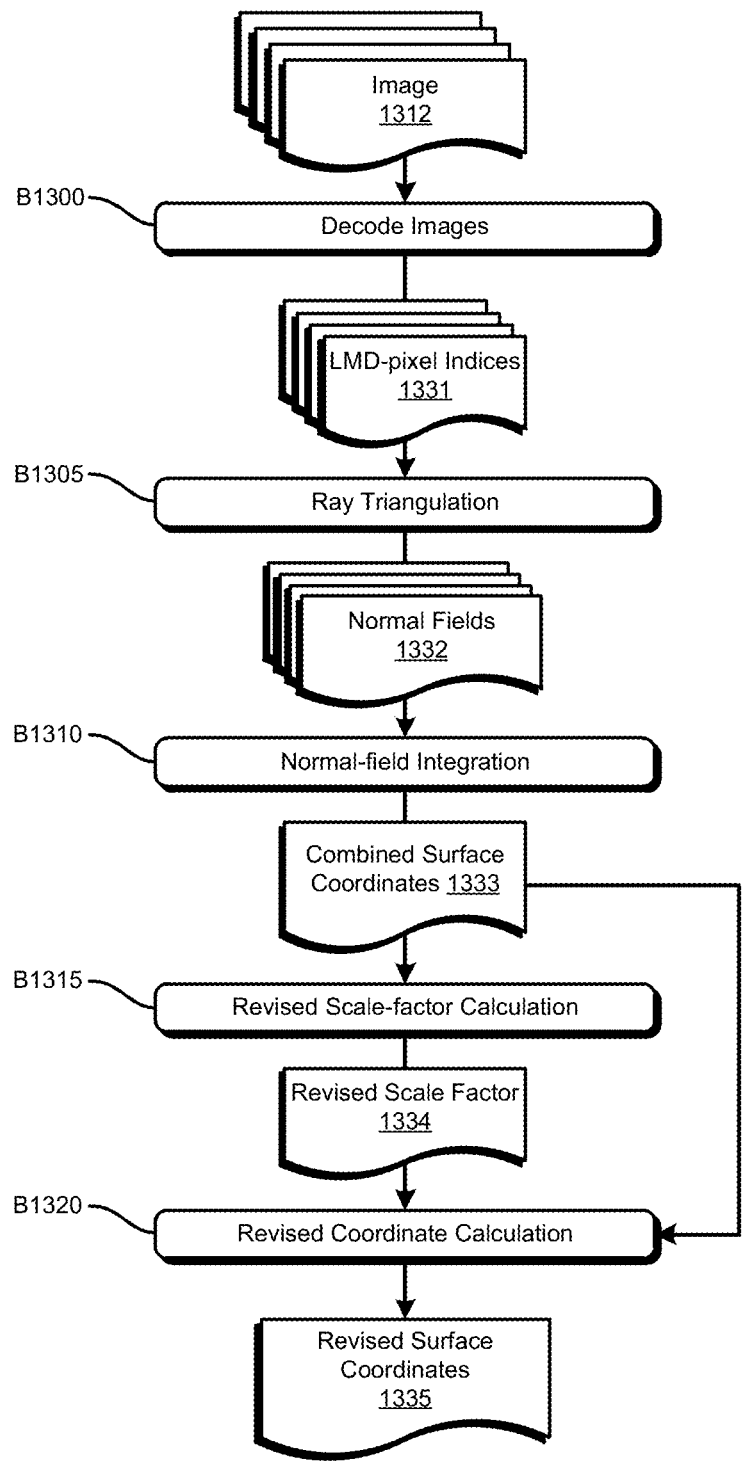
FIG. 13 illustrates an example embodiment of an operational flow for reconstructing the shape of an object.

FIG. 13 illustrates an example embodiment of an operational flow for measuring and reconstructing the shape of an object. Although this operational flow and the other operational flows that are described herein are each presented in a certain order, some embodiments of these operational flows perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although the operational flows that are described herein are performed by a measurement device, some embodiments of these operational flows are performed by two or more measurement devices or by one or more other specially-configured computing devices.

In block B1300, a measurement device obtains images 1312 of an object, and the measurement device decodes the images 1312 and generates respective LMD-pixel indices 1331 (e.g., LMD-pixel-index maps) for each of the images 1312. The images 1312 show the object from different viewpoints.

The LMD-pixel indices describe the LMD-pixel indices ((s, t) and (u, v) in FIG. 1) for regions (e.g., pixels, sets of contiguous pixels) in the image 1312 of the object. Thus, the LMD-pixel indices 1331 for a respective image 1312 describe, for a region of the image 1312, the respective pixels of the light-modulating devices (one pixel per light-modulating device) that transmitted a respective light ray i that was captured in the region.

Next, in block B1305, the measurement device performs ray triangulation based on the LMD-pixel indices 1331 to generate a respective normal field 1332 or point cloud for each image 1312 of the object. For example, for a light ray $\vec{r}$, the measurement device may triangulate its illumination light ray $\vec{r}_{in}$ and its reflected light ray $\vec{r}_{re}$ to determine the surface normal of the point on the object's surface that reflected the light ray $\vec{r}$.

Thus, the measurement device calculates a respective surface normal $\vec{n}$ for each of a plurality of points on the surface of the object based on the direction of the illumination light ray $\vec{r}_{in}$ of the specular reflection at the point and on the direction of the reflected light ray $\vec{r}_{re}$ of the specular reflection at the point. For example, some embodiments calculate the surface normal n as described by the following:

$$\vec{n} = \frac{-\vec{r}_{in} + \vec{r}_{re}}{\|-\vec{r}_{in} + \vec{r}_{re}\|}. \tag{21}$$

However, in other embodiments, the normal fields 1332 can be generated by other means. For example, in embodiments that measure the shapes of diffuse objects, the normal fields 1332 may be generated using coordinates that were obtained from time-of-flight cameras, structured-light scanners, or coded-aperture cameras that captured images of the object. Also for example, some embodiments use photometric stereo techniques that rely solely on normal-field calculation. And surface normals can also be estimated using only a three-dimensional point cloud.

The flow then moves to block B1310, where the measurement device performs normal-field integration on the normal fields 1332 (or the point cloud) to generate combined surface coordinates 1333. This may include converting coordinates from Cartesian coordinates to spherical coordinates. The combined surface coordinates 1333 are the spherical coordinates of respective points on the surface of the object (e.g., a point cloud of spherical coordinates) and collectively describe an integrated surface. To accomplish this, some embodiments of the measurement device combine all of the normal fields 1332 or point clouds into a single normal field or point cloud and then perform computations that can be described by some or all of equations (1)-(20). The combined surface coordinates 1333, which may be a point cloud, describe the relative positions of respective points on the surface in a uniform scale.

Additionally, in block B1310, the measurement device may separate the normal fields 1332 (or the point cloud) into different sets of normals (or different point clouds), each of which may have a different center of projection. Each of the different sets of normals (or point clouds) can be described by respective combined surface coordinates 1333. For example, if a line from the center of projection to the projection of the image surface would pass through two points in the normal fields, then those two points can be separated into different sets of normals. Accordingly, each set of normals (or each point cloud) can include only points for which a line from the center of projection to the projection of the image surface would pass through only one point, and each set of normals can include normals from different normal fields 1332. Also for example, if the surface normals $\vec{N}$ at some points are orthogonal to the radial-direction vector $\hat{r}$ for a particular center of projection, then these points can be separated out to form a second set of points. Another center of projection can then be selected for the points in the second set so that the surface normals $\vec{N}$ for these points are not orthogonal to the radial-direction vector $\hat{r}$.

After block B1310, the flow proceeds to block B1315, where revised scale-factor calculation is performed based on the combined surface coordinates 1333. This scale-factor calculation produces a revised scale factor 1334. In order to calculate the revised scale factor 1334, some embodiments of the measurement device compare a measurement of one or more dimensions of the object as described by the combined surface coordinates 1333 to another measurement of the one or more dimensions of the object (e.g., a measurement that is input by a user, a measurement from a time-of-flight camera, a measurement from a structured-light scanner, a measurement from a coded-aperture camera). Thus, if the object as described by the combined surface coordinates 1333 is 1 cm on the x-axis, and a measurement of the physical object on the x-axis is 2 cm, then the revised scale factor 1334 may be 2×uniform scale factor. In embodiments that separate the normal fields into different sets of normal fields and generate respective combined surface coordinates 1333 for the sets, a respective revised scale factor 1334 can be calculated for each set.

After block B1315 the flow proceeds to block B1320, where revised surface coordinates 1335 are calculated based on the combined surface coordinates 1333 and on the revised scale factor 1334. Also, in embodiments that separate the normal fields 1332 into different sets of normal fields and generate respective combined surface coordinates 1333 for the sets, respective revised coordinates can be calculated for each set and then combined to produce the respective combined surface coordinates 1335.

Figure 14:
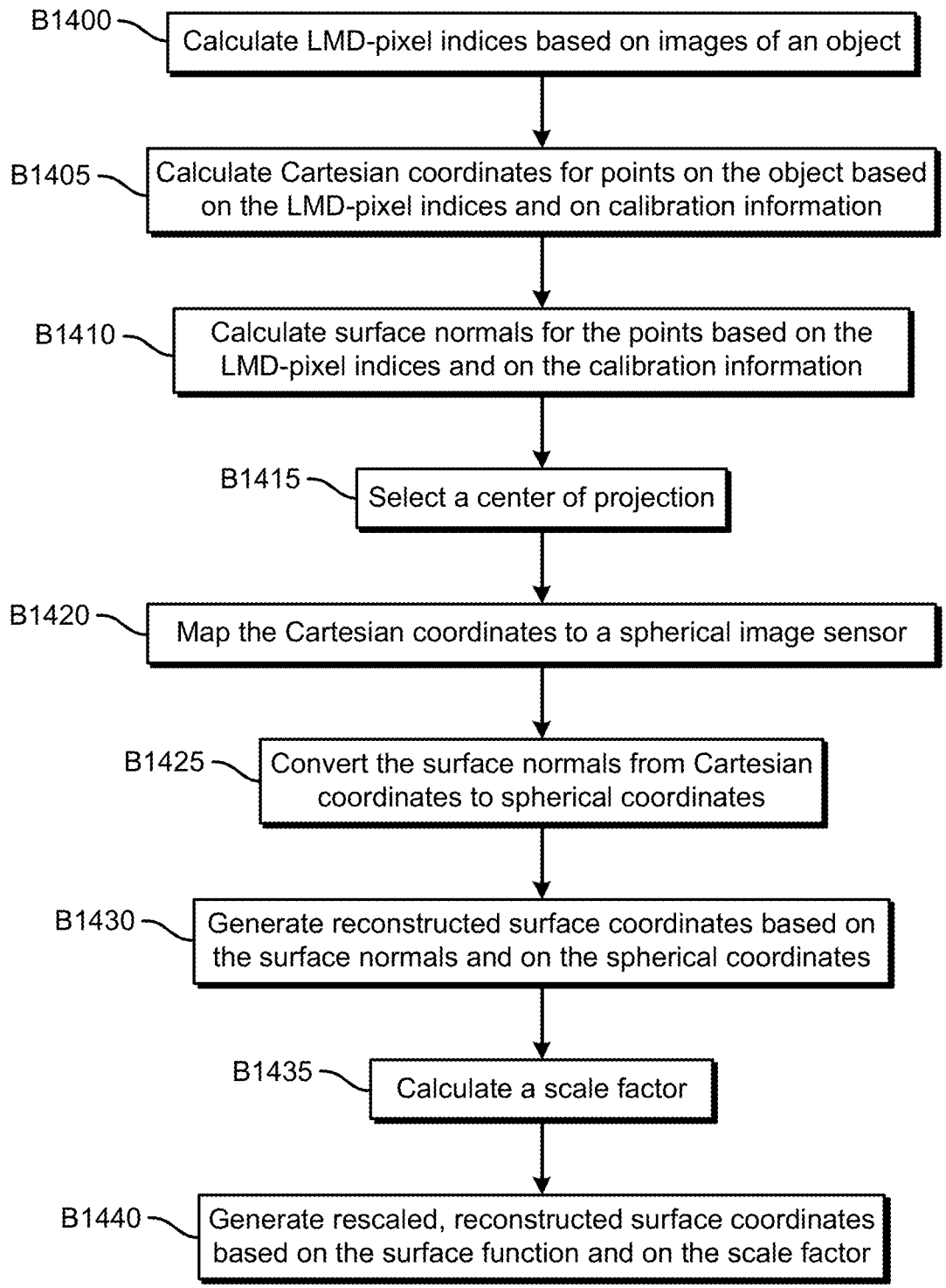
FIG. 14 illustrates an example embodiment of an operational flow for reconstructing the shape of an object.

FIG. 14 illustrates an example embodiment of an operational flow for reconstructing the shape of an object. The flow starts in block B1400, where a measurement device calculates LMD-pixels indices based on images of an object. Next, in block B1405, the measurement device calculates respective Cartesian coordinates for points on the object based on the LMD-pixel indices and on calibration information (e.g., one or more transformations), thereby producing a collection of points that are represented by Cartesian coordinates. The flow then moves to block B1410, where the measurement device calculates respective surface normals for the points on the object based on the LMD-pixel indices and on the calibration information. Thus, at the end of block B1410, the measurement device has coordinates and a surface normal for each point, and the coordinates and surface normal are represented in Cartesian coordinates.

Additionally, some embodiments obtain the coordinates and a surface normal for each point by using other means. For example, some embodiments obtain the coordinates and surface normals from other sources than encoded images, such as measurements from a stereoscopic camera, a time-of-flight camera, etc. Some of these sources may provide the coordinates and the surface normals without requiring the decoding of images.

Next, in block B1415, the measurement device selects a center of projection. The center of projection may be selected such that, based on the collection of points, the center of projection does not appear to lie on the surface of the object. Then, in block B1420, the measurement device uses the center of projection to map the Cartesian coordinates of the points to a spherical image sensor, thereby producing a collection (e.g., a point cloud) of spherical coordinates for the points. For example, the measurement device may calculate the spherical coordinates for a point as described by equations (1)-(3), using the Cartesian coordinates of the point and using the center of projection as the origin.

Next, in block B1425, the measurement device converts the surface normals from Cartesian coordinates to spherical coordinates based on the surface normals and on the spherical coordinates for the points, for example as described by equations (5)-(8). Thus, at the end of block B1425, the measurement device has coordinates and a surface normal for each point, and the coordinates and surface normal are represented in spherical coordinates.

The flow then proceeds to block B1430, where the measurement device generates reconstructed surface coordinates based on the spherical representations of the normal vectors or on the spherical representations of the coordinates (e.g., the azimuthal angle $\theta$ and the polar angle $\phi$), for example as described by one or more of equations (12)-(19). In some embodiments, the measurement device directly calculates the reconstructed surface coordinates for the points when numerically solving one or more of equations (12)-(15).

The flow then moves to block B1435, where the measurement device calculates a scale factor for the reconstructed surface coordinates. For example, in some embodiments, the measurement device calculates the scale factor using one or more points where a convex hull coincides with the object and the corresponding points in the spherical coordinates. Also, some embodiments of the measurement device calculate the scale factor using one or more obtained measurements of the object.

Finally, in block B1440, the measurement device generates rescaled, reconstructed surface coordinates (e.g., a point cloud of reconstructed surface coordinates) based on the reconstructed surface coordinates and on the scale factor. Depending on the embodiment, the reconstructed surface coordinates may include more points than the number of points in the collection of spherical coordinates, an equal number of points to the number of points in the collection of spherical coordinates, or fewer points than the number of points in the collection of spherical coordinates.

Figure 15:
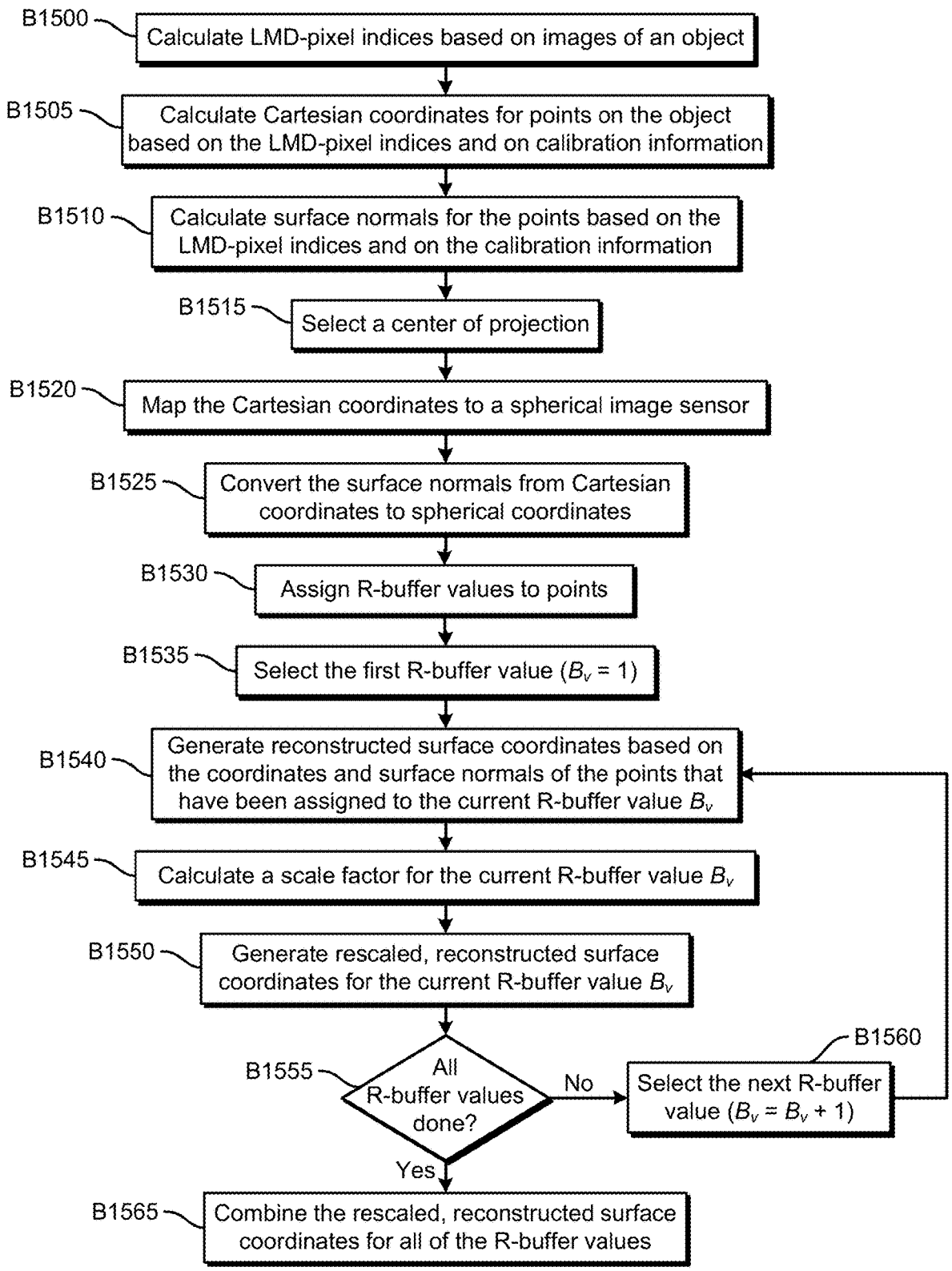
FIG. 15 illustrates an example embodiment of an operational flow for reconstructing the shape of an object.

FIG. 15 illustrates an example embodiment of an operational flow for reconstructing the shape of an object. The flow starts in block B1500, where a measurement device calculates LMD-pixels indices based on images of an object. Next, in block B1505, the measurement device calculates respective Cartesian coordinates for points on the object based on the LMD-pixel indices and on calibration information (e.g., one or more transformations), thereby producing a collection of points that are represented by Cartesian coordinates. The flow then moves to block B1510, where the measurement device calculates respective surface normals for the points on the object based on the LMD-pixel indices and on the calibration information. Thus, at the end of block B1510, the measurement device has coordinates and a surface normal for each point, and the coordinates and surface normal are represented in Cartesian coordinates.

Next, in block B1515, the measurement device selects a center of projection. The center of projection may be selected such that, based on the collection of points, the center of projection does not appear to lie on the surface of the object. Then, in block B1520, the measurement device uses the center of projection to map the Cartesian coordinates of the points to a spherical image sensor, thereby producing a collection (e.g., a point cloud) of spherical coordinates for the points. For example, the measurement device may calculate the spherical coordinates for a point as described by equations (1)-(3), using the Cartesian coordinates of the point and using the center of projection as the origin.

Next, in block B1525, the measurement device converts the surface normals from Cartesian coordinates to spherical coordinates based on the surface normals and on the spherical coordinates for the points, for example as described by equations (5)-(8). Thus, at the end of block B1525, the measurement device has coordinates and a surface normal for each point, and the coordinates and surface normal are represented in spherical coordinates.

The flow then moves to block B1530, where the measurement device assigns a respective R-buffer value to the points. For example, in some embodiments, all points for which a line from the center of projection to the spherical image sensor passes through only that point are assigned the same R-buffer value (e.g., 1, 2, 3, 4). And if a line from the center of projection to the spherical image sensor passes through multiple points, then the R-buffer value of the point closest to the center of projection is set to one value, the R-buffer value of the next closest point is set to another value, and so on. Also, in some embodiments, the same R-buffer value is assigned to the points in a group of points, for example all the points in an ear of the bunny in FIGS. 10-11 or all the points in a leg of the horse in FIG. 12.

The flow then proceeds to block B1535, where the measurement device selects the first R-buffer value $B_v$, which is 1 in this example. Then, in block B1540, the measurement device generates generates reconstructed surface coordinates for the points that have been assigned the current R-buffer value $B_v$ (which is 1 in the first iteration of block B1540) based on the spherical representations of the normal vectors or on the spherical representations of the coordinates (e.g., the azimuthal angle $\theta$ and the polar angle $\phi$) of the points, for example as described by equations (12)-(19). Following, in block B1545, the measurement device calculates a scale factor for the current R-buffer value $B_v$. The flow then advances to block B1550, where the measurement device generates rescaled, reconstructed surface coordinates for the current R-buffer value $B_v$ based on the reconstructed surface coordinates and on the scale factor.

Next, in block B1555, the measurement device determines if blocks B1540-B1550 have been performed for all R-buffer values. If they have not (block B1555=No), then the flow moves to block B1560, where the next R-buffer value $B_v$ is selected ($B_v=B_v+1$), and the flow returns to block B1540. Otherwise (block B1555=Yes) the flow moves to block B1565, where the measurement device combines the rescaled, reconstructed surface coordinates for all of the R-buffer values.

Also, some embodiments separate the points into groups of points without using R-buffer values, perform operations similar to blocks B1540-B1550 for each group, and combine the results similar to block B1565.

Figure 16:
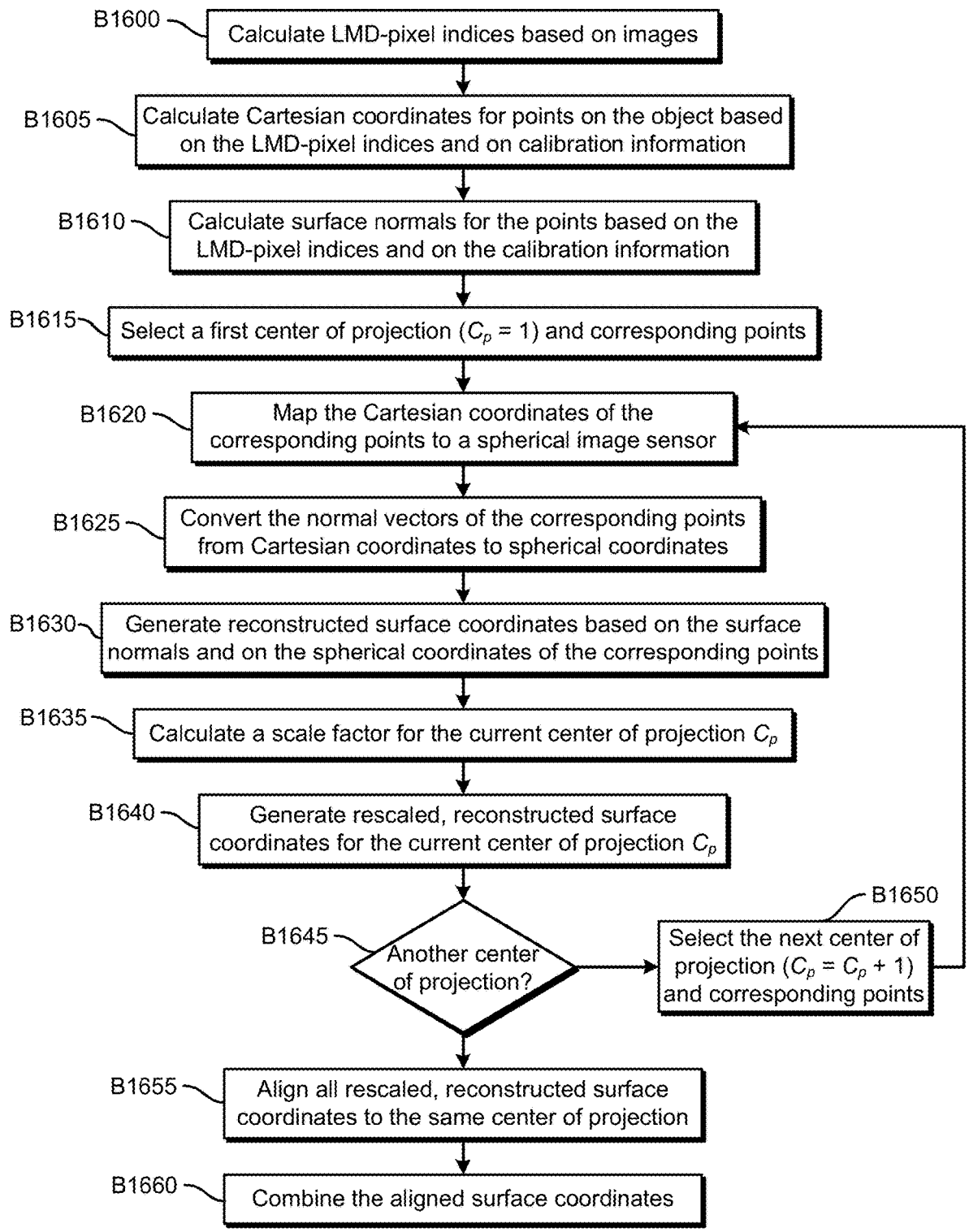
FIG. 16 illustrates an example embodiment of an operational flow for reconstructing the shape of an object.

FIG. 16 illustrates an example embodiment of an operational flow for reconstructing the shape of an object. The flow starts in block B1600, where a measurement device calculates LMD-pixels indices based on images of an object. Next, in block B1605, the measurement device calculates respective Cartesian coordinates for points on the object based on the LMD-pixel indices and on calibration information (e.g., one or more transformations), thereby producing a collection of points that are represented by Cartesian coordinates. The flow then moves to block B1610, where the measurement device calculates respective surface normals for the points on the object based on the LMD-pixel indices and on the calibration information. Thus, at the end of block B1610, the measurement device has coordinates and a surface normal for each point, and the coordinates and surface normal are represented in Cartesian coordinates.

Next, in block B1615, the measurement device selects a first center of projection $C_p$ and corresponding points. The corresponding points are points that have a surface normal $\vec{N}$ that is not orthogonal to the radial-direction vector $\hat{r}$ of the currently-selected center of projection.

Then, in block B1620, the measurement device uses the currently-selected center of projection to map the Cartesian coordinates of the corresponding points to a spherical image sensor, thereby producing a collection (e.g., a point cloud) of spherical coordinates for the corresponding points. For example, the measurement device may calculate the spherical coordinates for a point as described by equations (1)-(3), using the Cartesian coordinates of the point and using the currently-selected center of projection as the origin.

Next, in block B1625, the measurement device converts the surface normals of the corresponding points from Cartesian coordinates to spherical coordinates based on the surface normals and on the spherical coordinates for the points, for example as described by equations (5).-(8). Thus, at the end of block B1625, the measurement device has coordinates and a surface normal for each point, the coordinates and surface normal are represented in spherical coordinates, and the spherical coordinates use the currently-selected center of projection as the origin.

The flow then moves to block B1630, where the measurement device generates reconstructed surface coordinates for the corresponding points based on the spherical representations of the normal vectors and on the spherical representations of the coordinates (e.g., the azimuthal angle $\theta$ and the polar angle $\phi$) of the corresponding points, for example as described by equations (12)-(19). Following, in block B1635, the measurement device calculates a scale factor for the currently-selected center of projection $C_p$. The flow then advances to block B1640, where the measurement device generates rescaled, reconstructed surface coordinates for the currently-selected center of projection $C_p$ based on the reconstructed surface coordinates and on the scale factor.

Next, in block B1645, the measurement device determines if blocks B1620-B1640 have been performed for all centers of projection. If not (block B1645=No), then the flow moves to block B1650, where the next center of projection ($C_p=C_p+1$) and its corresponding points are selected, and the flow returns to block B1620. Otherwise (block B1645=Yes) the flow moves to block B1555.

In block B1655, the measurement device aligns all the rescaled, reconstructed surface coordinates to the same center of projection. In some embodiments, this is performed by selecting one center of projection as the point of reference, and shifting the center of projection of all the rescaled, reconstructed surface coordinates that used another center of projection. Finally, in block B1660, the measurement device combines the aligned rescaled, reconstructed surface coordinates.

Additionally, some operational flows use multiple R-buffer values (e.g., as described in FIG. 15) and use multiple centers of projection (e.g., as described in FIG. 16). Thus, some embodiments of these operational flows use blocks from both FIG. 15 and FIG. 16.

Figure 17:
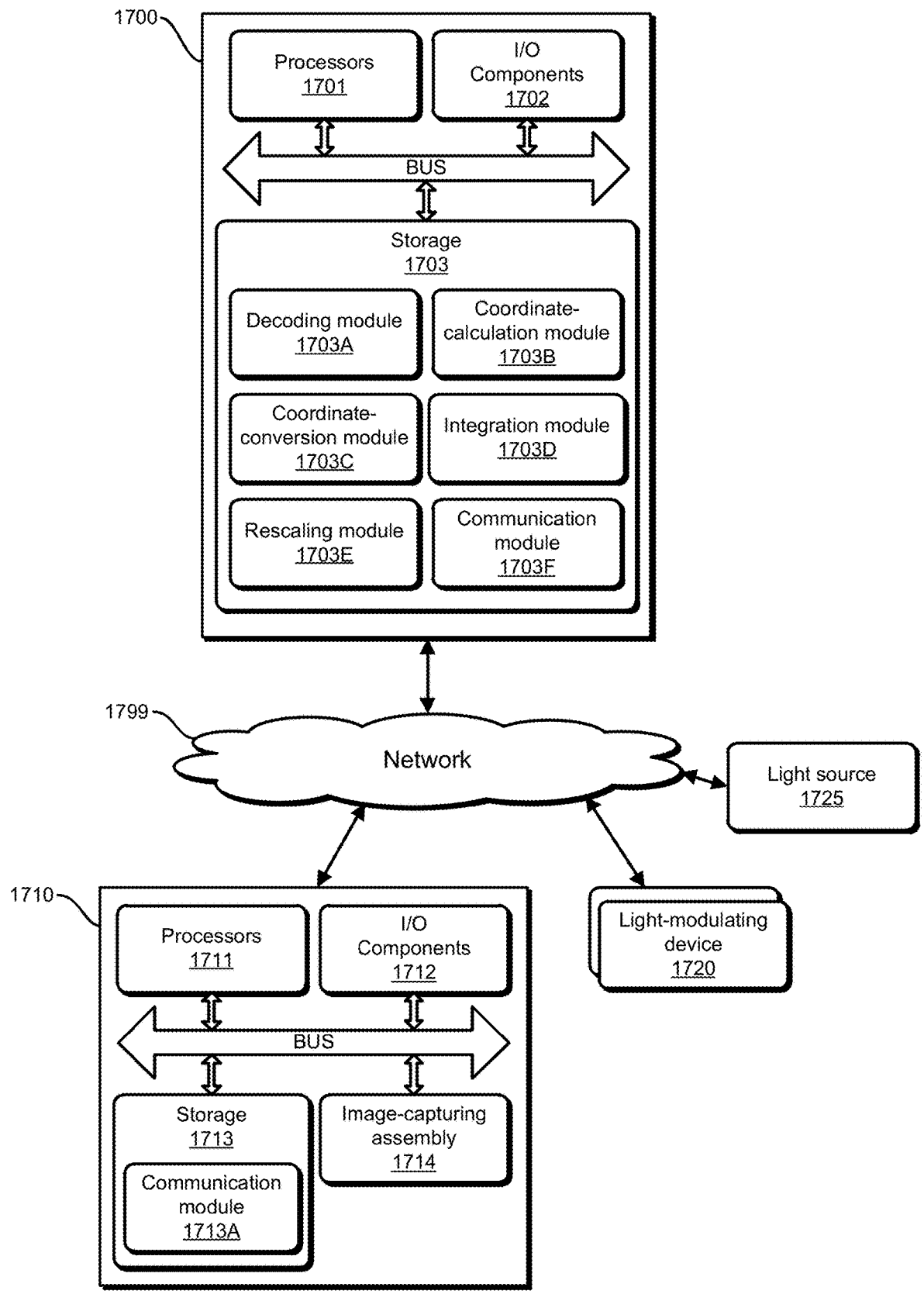
FIG. 17 illustrates an example embodiment of a system for reconstructing the shapes of objects.

FIG. 17 illustrates an example embodiment of a system for measuring and reconstructing the shapes of objects. The system includes a measurement device 1700, which is a specially-configured computing device; two or more light-modulating devices 1720; a light source 1725; and an image-capturing device 1710. In this embodiment, the devices communicate by means of one or more networks 1799, which may include a wired network, a wireless network, a LAN, a WAN, a MAN, and a PAN. Also, in some embodiments the devices communicate by means of other wired or wireless channels.

The measurement device 1700 includes one or more processors 1701, one or more I/O components 1702, and storage 1703. Also, the hardware components of the measurement device 1700 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1701 include one or more central processing units (CPUs), which include microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). The I/O components 1702 include communication components (e.g., a GPU, a network-interface controller) that communicate with input and output devices, which may include a keyboard, a display device, a mouse, a printing device, a touch screen, a light pen, an optical-storage device, a scanner, a microphone, a drive, a controller (e.g., a joystick, a control pad), and the network 1799. In some embodiments, the I/O components 1702 also include specially-configured communication components that communicate with the image-capturing device 1710, the two or more light-modulating devices 1720, and the light source 1725.

The storage 1703 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1703, which may include both ROM and RAM, can store computer-readable data or computer-executable instructions.

The measurement device 1700 also includes a decoding module 1703A, a coordinate-calculation module 1703B, a coordinate-conversion module 1703C, an integration module 1703D, a rescaling module 1703E, and a communication module 1703F. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 1703.

The decoding module 1703A includes instructions that, when executed, or circuits that, when activated, cause the measurement device 1700 to decode images and determine LMD-pixel indices, for example as performed in block B1300 in FIG. 13, in block B1400 in FIG. 14, in block B1500 in FIG. 15, or in block B1600 in FIG. 16.

The coordinate-calculation module 1703B includes instructions that, when executed, or circuits that, when activated, cause the measurement device 1700 to calculate surface normals (e.g., normal fields) or three-dimensional Cartesian coordinates of points on the surface of an object, for example as performed in block B1305 in FIG. 13, in blocks B1405-B1410 in FIG. 14, in blocks B1505-B1510 in FIG. 15, or in blocks B1605-B1610 in FIG. 16.

The coordinate-conversion module 1703C includes instructions that, when executed, or circuits that, when activated, cause the measurement device 1700 to convert Cartesian coordinates to spherical coordinates, for example as performed in blocks B1415-B1425 in FIG. 14, in blocks B1515-B1525 in FIG. 15, or in blocks B1615-B1625 in FIG. 16. The coordinate-calculation module 1703B may call the coordinate-conversion module 1703C.

The integration module 1703D includes instructions that, when executed, or circuits that, when activated, cause the measurement device 1700 to generate combined surface coordinates based on a set of surface normals or a set of spherical coordinates, for example as performed in block B1310 in FIG. 13, in block B1430 in FIG. 14, in blocks B1530-B1540 and B1555-B1565 in FIG. 15, or in blocks B1630 and B1645-B1660 in FIG. 16.

The rescaling module 1703E includes instructions that, when executed, or circuits that, when activated, cause the measurement device 1700 to generate a revised scale factor and generate revised surface coordinates, for example as performed in blocks B1315 and B1320 in FIG. 13, in blocks B1435-B1440 in FIG. 14, in blocks B1545-B1550 in FIG. 15, or in blocks B1635-B1640 in FIG. 16.

The communication module 1703F includes instructions that, when executed, or circuits that, when activated, cause the measurement device 1700 to communicate with one or more other devices, for example the image-capturing device 1710, the two or more light-modulating devices 1720, and the light source 1715.

The image-capturing device 1710 includes one or more processors 1711, one or more I/O components 1712, storage 1713, a communication module 1713A, and an image-capturing assembly 1714. The image-capturing assembly 1714 includes one or more image sensors, one or more lenses, and an aperture. The communication module 1713A includes instructions that, when executed, or circuits that, when activated, cause the image-capturing device 1710 to receive a request for an image from a requesting device, retrieve a requested image from the storage 1713, or send a retrieved image to the requesting device (e.g., the measurement device 1700).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:
1. A device comprising:
one or more computer-readable storage media; and one or more processors that are coupled to the one or more computer-readable storage media and that are configured to cause the device to
obtain encoded images of an object,
generate respective light-modulating-device-pixel indices for areas of the encoded images based on the encoded images,
generate respective coordinates of points on the object based on the light-modulating-device-pixel indices,
generate respective surface normals at the points based on the light-modulating-device-pixel indices,
map the respective coordinates of the points to a spherical image sensor, thereby producing respective spherical-coordinate representations of the points,
generate spherical-coordinate representations of the respective surface normals based on the spherical coordinates of the points, and
generate reconstructed surface coordinates based on the spherical-coordinate representations of the respective surface normals.

2. The device of claim 1, wherein the one or more processors are further configured to cause the device to:
calculate a scale factor based on the respective spherical-coordinate representation of a point and on a measurement of the object, and
rescale the reconstructed surface coordinates based on the scale factor.

3. The device of claim 1, wherein to map the respective coordinates of the points to the spherical image sensor, the one or more processors are further configured to cause the device to describe a point and a pixel of the spherical image sensor to which the point is mapped with a same azimuthal angle and a same polar angle.

4. The device of claim 1, wherein to generate the reconstructed surface coordinates based on the spherical-coordinate representations of the respective surface normals, the one or more processors are configured to cause the device to solve partial differential equations that can be described by the following:

$$\frac{\partial g}{\partial \theta} = -\frac{N_\theta}{N_r}\sin(\phi), \text{ and}$$
$$\frac{\partial g}{\partial \phi} = -\frac{N_\phi}{N_r},$$

where $\theta$ is an azimuthal angle; where $\phi$ is a polar angle; where $N_r$, $N_\theta$, and $N_\phi$ are components of a surface normal $\vec{N}$ along a vector $\hat{r}$, a vector $\hat{\theta}$, and a vector $\hat{\phi}$, respectively; and where $g(\theta,\phi)=\log(R(\theta,\phi))$, where $R(\theta,\phi)$ is a function that describes a surface of the object.

5. The device of claim 1, wherein the reconstructed surface coordinates are represented by a point cloud.

6. A method comprising:
obtaining respective surface normals for points on an object;
mapping the surface normals to a spherical image sensor; and
generating reconstructed surface coordinates based on the surface normals that have been mapped to the spherical image sensor.

7. The method of claim 6, wherein obtaining the respective surface normals for points on the object comprises:
obtaining encoded images of the object;
generating respective light-modulating-device-pixel indices for areas of the encoded images based on the encoded images; and
generating the respective surface normals for points on the object based on the light-modulating-device-pixel indices.

8. The method of claim 6, wherein the mapping of the surface normals to a spherical image sensor uses an orthographic projection.

9. The method of claim 6, wherein generating the reconstructed surface coordinates based on the surface normals that have been mapped to the spherical image sensor includes solving partial differential equations that can be described by the following:

$$\frac{\partial g}{\partial \theta} = -\frac{N_\theta}{N_r}\sin(\phi), \text{ and}$$
$$\frac{\partial g}{\partial \phi} = -\frac{N_\phi}{N_r},$$

where $\theta$ is an azimuthal angle; where $\phi$ is a polar angle; where $N_r$, $N_\theta$, and $N_\phi$ are components of a surface normal $\vec{N}$ along a vector $\hat{r}$, a vector $\hat{\theta}$, and a vector $\hat{\phi}$, respectively; and where $g(\theta,\phi)=\log(R(\theta,\phi))$, where $R(\theta,\phi)$ is a function that describes a surface of the object.

10. The method of claim 6, further comprising:
rescaling the reconstructed surface coordinates based on a measurement of the object.

11. The method of claim 6, wherein mapping the surface normals to a spherical image sensor includes selecting a center of projection that does not lie on a surface of the object.

12. The method of claim 6, wherein the surface normals are represented by a normal field.

13. One or more non-transitory computer-readable storage media storing instructions that, when executed by one or more computing devices, cause the one or more computing devices to perform operations comprising:
obtaining respective spherical coordinates of points on an object;
obtaining respective spherical-coordinate representations of surface normals at the points on the object; and
generating reconstructed surface coordinates based on the respective spherical coordinates and on the respective spherical-coordinate representations of the surface normals.

14. The one or more non-transitory computer-readable storage media of claim 13, wherein generating the reconstructed surface coordinates includes numerically solving a function that describes a surface of the object, wherein the function uses azimuthal angle and polar angle as inputs.

15. The one or more non-transitory computer-readable storage media of claim 14, wherein the function that describes the surface of the object includes a partial derivative of the function with respect to azimuthal angle and includes a partial derivative of the function with respect to polar angle.

16. The one or more non-transitory computer-readable storage media of claim 15, wherein the partial derivative of the function with respect to azimuthal angle and the partial derivative of the function with respect to polar angle can be described by the following:

$$\frac{\partial g}{\partial \theta} = -\frac{N_\theta}{N_r}\sin(\phi), \text{ and}$$

$$\frac{\partial g}{\partial \phi} = -\frac{N_\phi}{N_r},$$

where $\theta$ is an azimuthal angle; where $\phi$ is a polar angle; where $N_r$, $N_\theta$, and $N_\phi$ are components of a surface normal $\vec{N}$ along a vector $\hat{r}$, a vector $\hat{\theta}$, and a vector $\hat{\phi}$, respectively; and where $g(\theta,\phi)=\log(R(\theta,\phi))$, where $R(\theta,\phi)$ is the function that describes the surface of the object.

17. The one or more non-transitory computer-readable storage media of claim 13, wherein the operations further comprise:
generating scaled, reconstructed surface coordinates based on the reconstructed surface coordinates and on a scale factor.

18. The one or more non-transitory computer-readable storage media of claim 13, wherein the operations further comprise separating the points on the object into a first group and a second group, and
wherein generating the reconstructed surface coordinates based on the respective spherical coordinates and on the respective spherical-coordinate representations of the surface normals includes
generating the reconstructed surface coordinates of the points in the first group based on the respective spherical coordinates of the points in the first group and on the respective spherical-coordinate representations of the surface normals of the points in the first group, and
generating the reconstructed surface coordinates of the points in the second group based on the respective spherical coordinates of the points in the second group and on the respective spherical-coordinate representations of the surface normals of the points in the second group.

19. The one or more non-transitory computer-readable storage media of claim 18, wherein the points in the first group are points that are not separated from a center of projection by another point, and
wherein the points in the second group are points that are separated from the center of projection by another point.

* * * * *